(12) United States Patent
Kingery

(10) Patent No.: US 11,447,061 B2
(45) Date of Patent: Sep. 20, 2022

(54) RATCHET CONFIGURATIONS

(71) Applicant: Kenneth G. Kingery, Mesa, AZ (US)

(72) Inventor: Kenneth G. Kingery, Mesa, AZ (US)

( * ) Notice: Subject to any disclaimer, the term of this patent is extended or adjusted under 35 U.S.C. 154(b) by 556 days.

(21) Appl. No.: 16/351,022

(22) Filed: Mar. 12, 2019

(65) Prior Publication Data

US 2019/0210511 A1 Jul. 11, 2019

Related U.S. Application Data

(62) Division of application No. 15/170,801, filed on Jun. 1, 2016, now Pat. No. 10,227,030.

(60) Provisional application No. 62/169,114, filed on Jun. 1, 2015.

(51) Int. Cl.
*B60P 7/08* (2006.01)

(52) U.S. Cl.
CPC ............ *B60P 7/0846* (2013.01); *B60P 7/083* (2013.01)

(58) Field of Classification Search
CPC ................................ B60P 7/0846; B60P 7/083
See application file for complete search history.

(56) References Cited

U.S. PATENT DOCUMENTS

| | | | | |
|---|---|---|---|---|
| 305,518 A * | 9/1884 | Horseman | ............... | B60P 7/083 254/217 |
| 737,765 A * | 9/1903 | Olsen | ...................... | B60P 7/083 254/223 |
| 1,111,118 A * | 9/1914 | Williamson | ............. | B66D 3/04 254/409 |
| 3,807,696 A * | 4/1974 | Brda | ........................ | A62B 1/14 182/241 |
| 4,542,883 A * | 9/1985 | Rutzki | .................... | B60P 7/083 254/223 |
| 5,368,281 A * | 11/1994 | Skyba | ..................... | B25B 25/00 254/223 |
| 5,542,798 A * | 8/1996 | Rawdon | ................. | B60P 7/083 24/68 CD |
| 5,722,640 A * | 3/1998 | Skyba | ..................... | F16H 55/38 254/371 |
| 6,068,242 A * | 5/2000 | Kingery | ................... | B66D 3/10 254/409 |
| 7,287,303 B2 * | 10/2007 | Yang | .................... | B66D 1/7415 24/265 H |
| 7,651,072 B1 * | 1/2010 | Chang | .................... | B60P 7/083 254/218 |

(Continued)

*Primary Examiner* — Michael E Gallion
(74) *Attorney, Agent, or Firm* — Bycer & Marion, PLC; Matthew L. Bycer; Michael B. Marion

(57) ABSTRACT

An apparatus and system for improving rope, strap, tie downs, hooks, and nets is provided. Includes a new design whereby the apparatus has a thick walled body made of nylon, aluminum, or stainless steel with a spool and center hub and axle throughout the spool body frame and handle. The apparatus uses multiple coils to automatically retract strap or rope within the spool hub. It also contains a tangential rib opposing the face wheel. The apparatus may have gears on the radius of the wheel, spring loaded slidable pawl plates, or pivotally rotatable pawls or plates which allow the proper engagement of the wheel ratchet. It may also have rope, strap, or belt that is non-cuttable and corrosion, petrol, and chemical resistant used in tie downs and nets. The apparatus may have a lockable body frame, and/or hooks that are lockable to prevent theft.

8 Claims, 20 Drawing Sheets

(56) References Cited

U.S. PATENT DOCUMENTS

| | | | | |
|---|---|---|---|---|
| 7,658,264 B2* | 2/2010 | Mauthner | ............... | B66D 3/046 |
| | | | | 182/5 |
| 7,762,531 B2* | 7/2010 | Bond | ....................... | B66D 1/04 |
| | | | | 254/218 |
| 7,823,259 B2* | 11/2010 | Yang | ..................... | B60P 7/0876 |
| | | | | 254/365 |
| 9,254,779 B2* | 2/2016 | Kingery | ................... | B60P 7/083 |
| 9,272,886 B2* | 3/2016 | Kingery | ................... | B66D 3/02 |
| 9,452,916 B2* | 9/2016 | Bond | ....................... | B66D 1/04 |
| 9,770,071 B2* | 9/2017 | Kingery | ................... | B60P 7/083 |
| 10,828,516 B2* | 11/2020 | Chabod | .................... | A62B 1/10 |
| 2003/0085392 A1* | 5/2003 | Hsieh | ....................... | B66D 3/02 |
| | | | | 254/374 |
| 2006/0277726 A1* | 12/2006 | Hsieh | .................... | B60P 7/0823 |
| | | | | 24/68 R |
| 2010/0275417 A1* | 11/2010 | Yang | ....................... | F16G 11/12 |
| | | | | 24/115 L |
| 2011/0204306 A1* | 8/2011 | Kingery | ................. | B66D 3/046 |
| | | | | 254/391 |
| 2013/0112929 A1* | 5/2013 | Xiao | ....................... | B60P 7/083 |
| | | | | 254/237 |
| 2014/0008593 A1* | 1/2014 | Kingery | ................. | B60P 7/083 |
| | | | | 254/376 |
| 2014/0262611 A1* | 9/2014 | Oddou | ..................... | A62B 1/14 |
| | | | | 182/5 |
| 2014/0338161 A1* | 11/2014 | Armour | ................... | B60P 7/083 |
| | | | | 24/68 CD |
| 2016/0090021 A1* | 3/2016 | Dunmire | ............... | B60P 7/0823 |
| | | | | 410/103 |
| 2016/0347233 A1* | 12/2016 | Kingery | ................ | B60P 7/0846 |
| 2018/0072216 A1* | 3/2018 | Willodson | ............ | B60P 7/0823 |
| 2019/0255984 A1* | 8/2019 | Kingery | ................ | B60P 7/0823 |

* cited by examiner

PRIOR ART

PRIOR ART

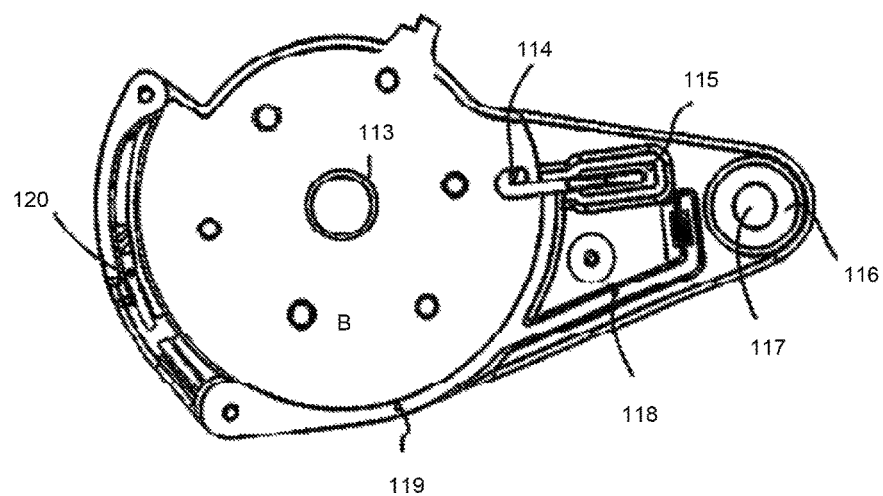
FIG. 11A
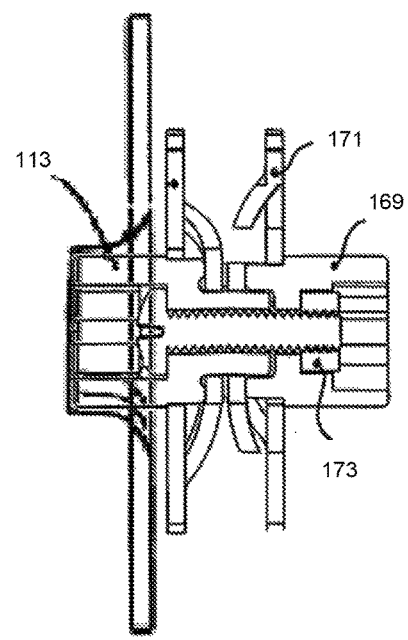
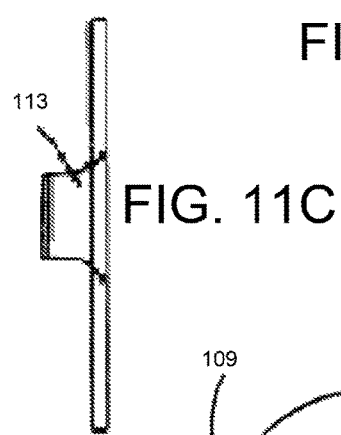
FIG. 11C
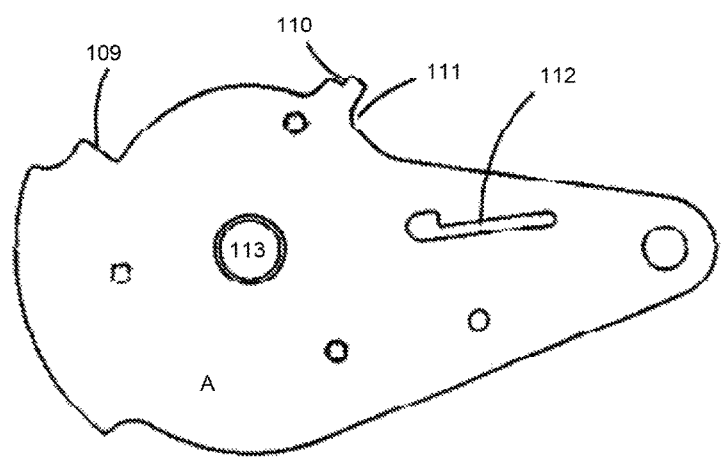
FIG. 11D
Fig 11B

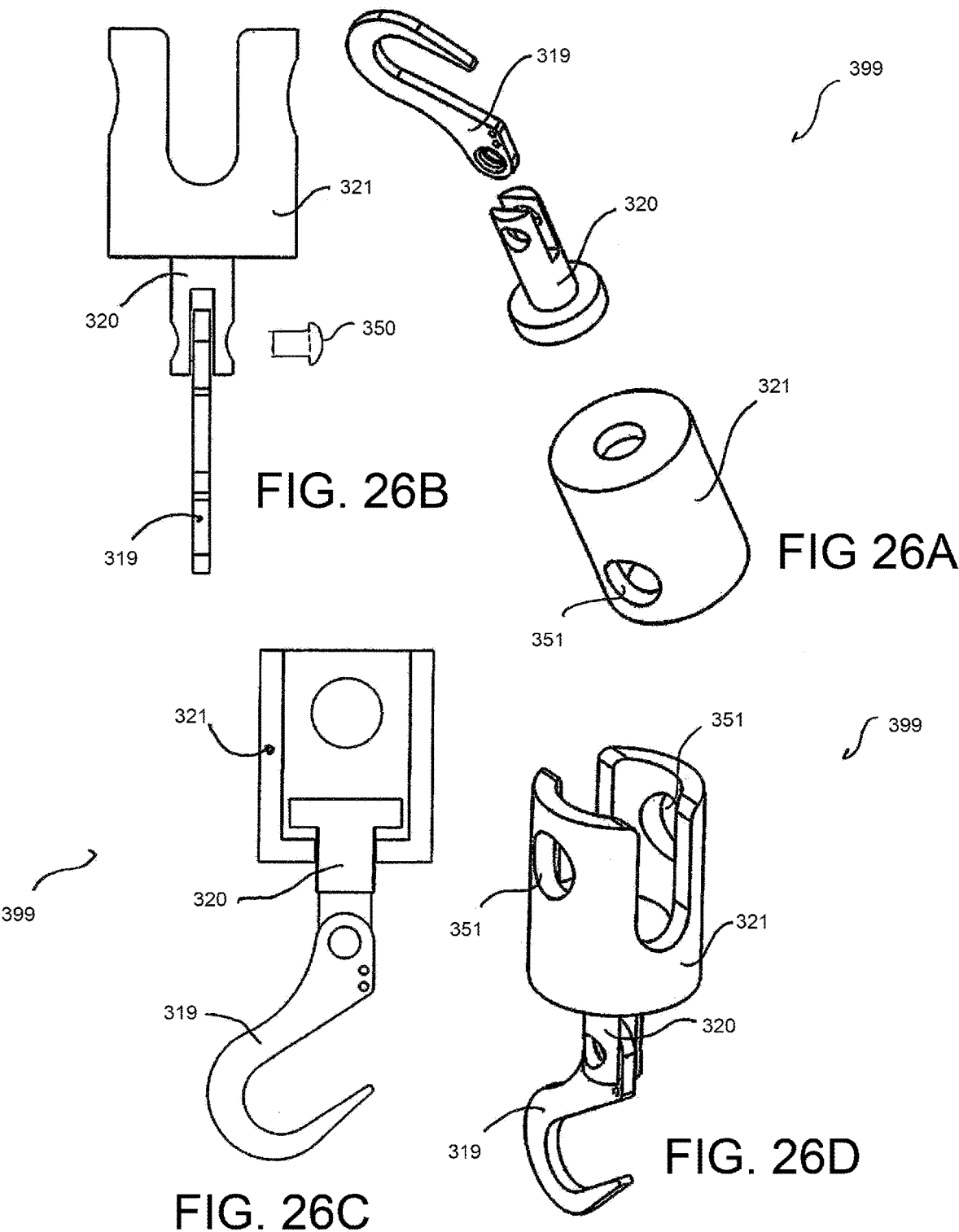

RATCHET CONFIGURATIONS

CROSS REFERENCE TO RELATED APPLICATIONS

The present application is a divisional of and includes subject matter disclosed in and claims priority to a nonprovisional patent application entitled "Ratchet Configurations" filed Jun. 1, 2016, and assigned Ser. No. 15/170,801, now U.S. Pat. No. 10,227,030, and a provisional patent application entitled "Ratchet and Net Configurations" filed Jun. 1, 2015 and assigned Ser. No. 62/169,114, describing inventions made by the present inventor, both applications herein incorporated by reference.

BACKGROUND OF THE INVENTION

1. Field of the Invention

The present invention relates a rope or strap apparatus with an automatic winding device. More specifically, the present invention relates to an apparatus such as a ratchet having a compact, durable, repairable design incorporating an optional lockable housing.

2. Description of Related Prior Art

Conventional strapping or rope apparatuses are inconvenient and not capable of winding rope or strap/webbing automatically. One problem involves the operator needing to roll up the rope or strap/webbing by gathering the ends and placing them in storage until future need. This requires the operator to spend valuable time untangling, unknotting, and straightening the rope or webbing before use. This creates a lack of functionality, and wear and tear with conventional strapping devices.

Another problem with conventional strapping apparatuses involves the handles pivotally rotating upon the mandrel axle or axes, creating wear and rotational drag upon the handle of the wheel spool while operating the handle. When the handle is pivotally rotated to release the ratchet apparatus using the attached handle to the axes through the spool hub, the mandrel on the axle becomes uneven during rotation. This results in excessive pressure on the axle and a detent pawl plate while disengaging. This prevents a smooth rotation of the axle when released, creating damage to moving parts.

A further problem with conventional automatic reeling apparatuses is the location of the automatic reeling spring on the exterior of the frame. This makes the automatic reeling spring vulnerable to the elements and can sustain damage when dropped on the ground or from a vehicle while in use or after use of the device. This can cause catastrophic failure to the spring and housing.

Another problem with conventional tie down devices involves the sliding detent pawl plates. The plates traditionally use a center pin or spring, or offset the spring from the frame to the center of the detent pawl plate. This prevents the frame or handle pawl plates from sliding away or engaging the ratchet evenly. The sliding detent pawl plates become angled, offset in movement and create wear and damage to parts, springs, frames, or the handle creating catastrophic failure of the device.

Yet another problem with conventional tie down devices involves the lack of anti-theft capabilities. There is no function to lock the apparatus when required by the user in order to keep the cargo and tie downs locked for security purposes.

A further problem with traditional ratchets is that straps do not last long and are not durable, which calls for new technology to improve the longevity of straps/webbing used in ratchets.

Yet another problem with conventional tie down devices, rope, cord, webbing, strap, cables or the like that are sewn, ferruled with fasteners, knots, or the like to connect to one another have a limited longevity.

Yet another problem with typical ratchets is the handle levers need to spread the handle over the body frame, axle, or mandrel spool, which causes warping. With no way to straighten the traditional handle, it causes drag, stress, and friction when fixed to the mandrel or spool hub. This prevents free movement of the spool and the handle in a typical device.

SUMMARY OF THE INVENTION

According to the present invention, a rope, webbing, or strapping apparatus is a simple structural design to house a wheel spool. The design has defined ratchet plates with a centered aperture to be secured to the tube spool with a channel throughout, and a center hole within the ratchet plates to the center. Additionally, the assembly has one ratcheting wheel spool housing a rope, strap, webbing or the like around the centered axle throughout the spool assembly, and rotationally wraps around the spool for storage until future need. A coil or multiple coil springs include a centered end of the coil that connects to the axle, and a second end connected to the handle within the housing coil spring cavities. The coil is connected in such a way as to apply tension to the spring when manually rotating the wheel spool in a clockwise direction to pull the strap away from the tie down device in the storage spool. The spring will coil around the axle within the handle spring cavity, applying tension automatically to force rotation of the spool hub in a counterclockwise direction, rewinding the strap or rope around the hub inside the ratchet discs within the frame body. The rope or strap can be comprised of traditional materials such as Dyneema, Vectran, Technora, or non-traditional materials such as steel cables that may or may not be coated in polyurethane, rubber, or the like which makes it chemical and corrosion resistant. This material can also be used to make a cargo net that may or may not include a cinch rope made of the same material or more traditional fibers. The apparatus or cargo net may include lockable plates or hooks for an anti-theft deterrent.

It is therefore a primary object of the present invention to provide a rope or flat strap tie down device which incorporates a positive traction for tensioning in a stable reverse coil spring for securing a reverse tension on the rope or strap.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which:

FIG. 9 demonstrates another partially exploded view of the embodiment as shown in FIG. 6;

FIG. 11A demonstrates a side view of a frame of an embodiment of the present invention without over molded material;

FIG. 11B shows the opposite side of the frame shown in FIG. 9A;

FIG. 11C shows a frontal view of a flared axle boss;

FIG. 11D shows a frontal view of a flared axle boss and hub;

FIGS. 26A-D demonstrates a swivel hook anchor mechanism to attach to frame of an embodiment of the present invention.

DESCRIPTION OF THE PREFERRED EMBODIMENT

Figure 1:
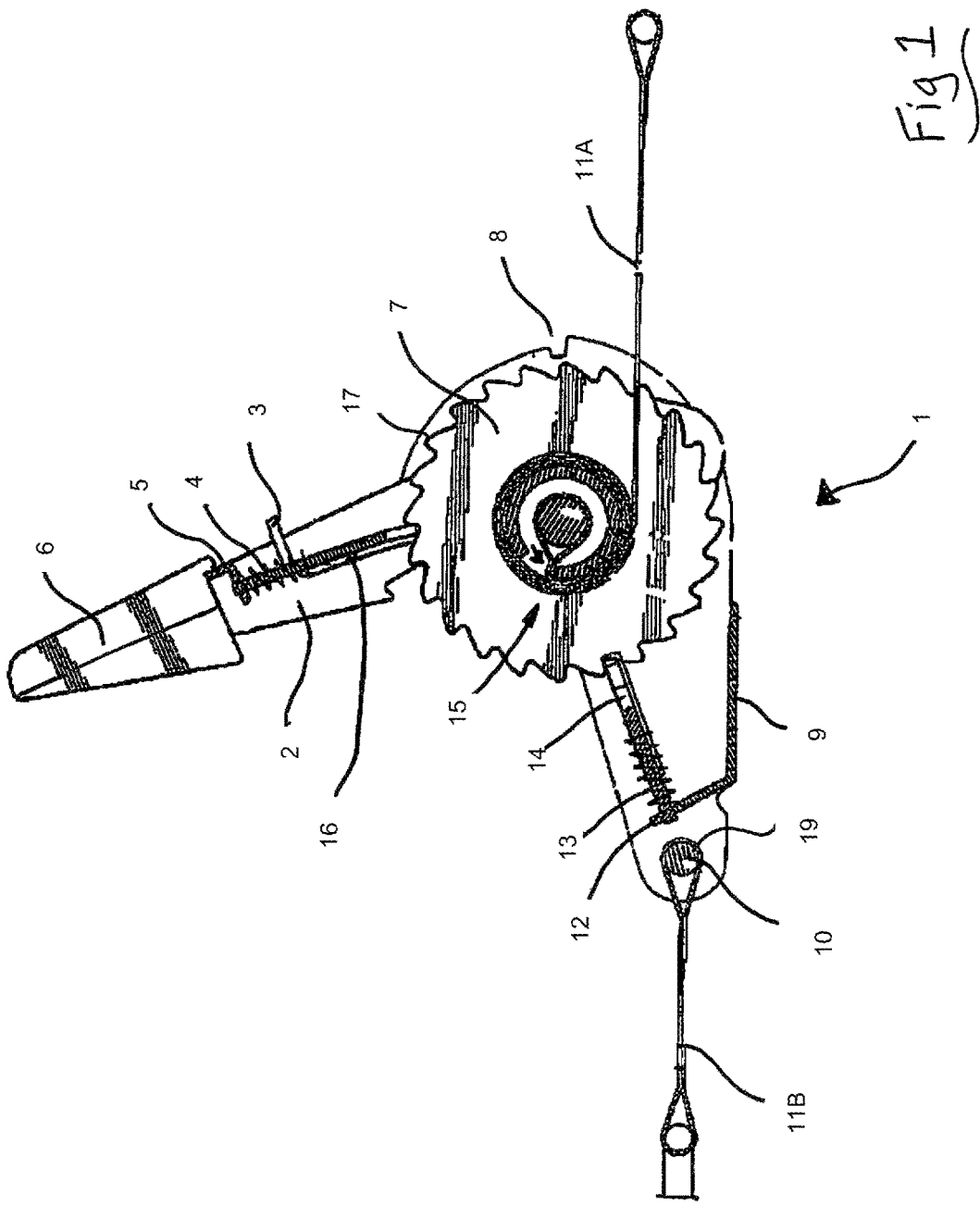
FIG. 1 illustrates a partially cutaway side view of an embodiment of the present invention.
Figure 2:
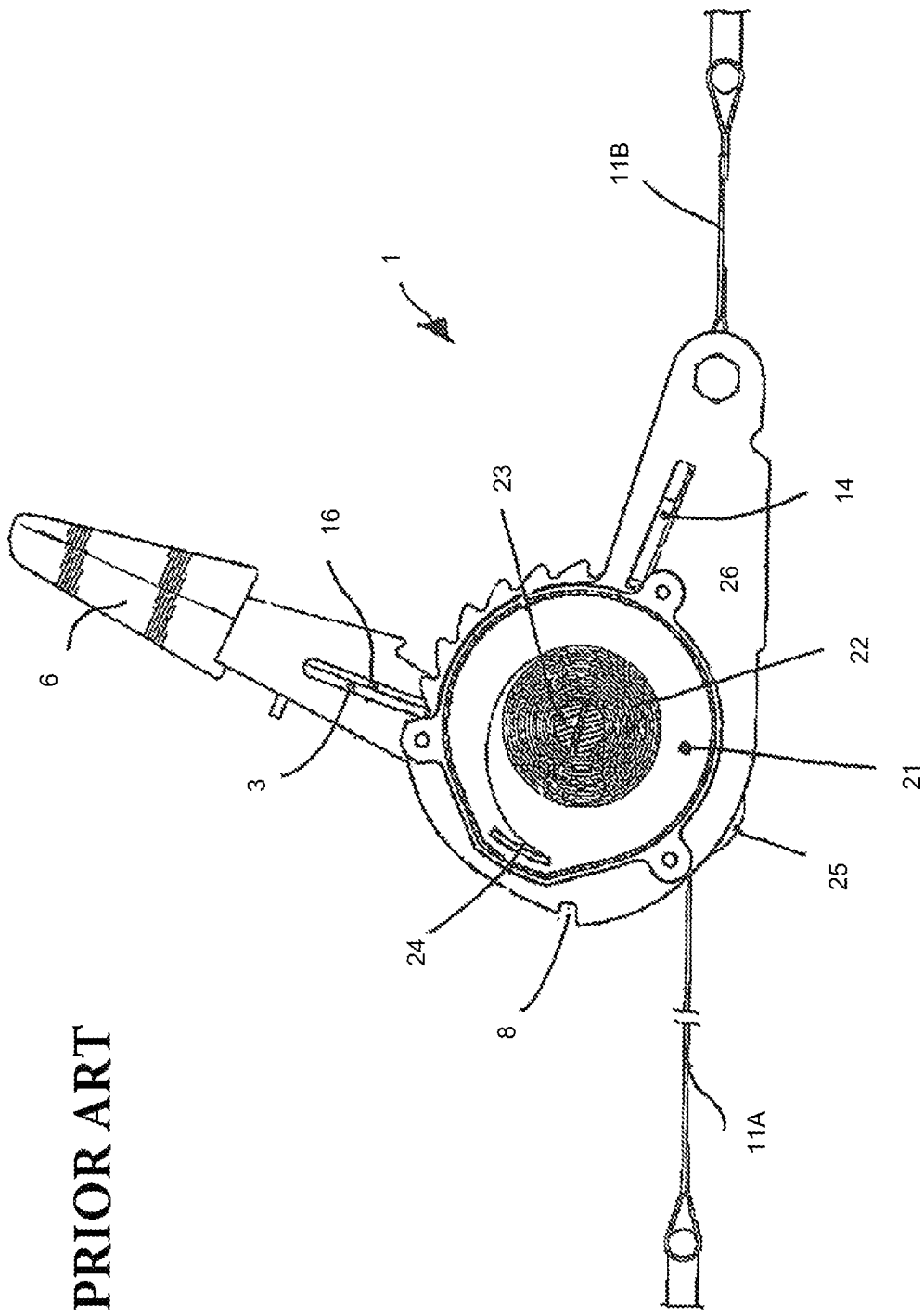
FIG. 2 illustrates a partially cutaway side view of the opposite side of an embodiment of the present invention as shown in FIG. 1.
Figure 3:
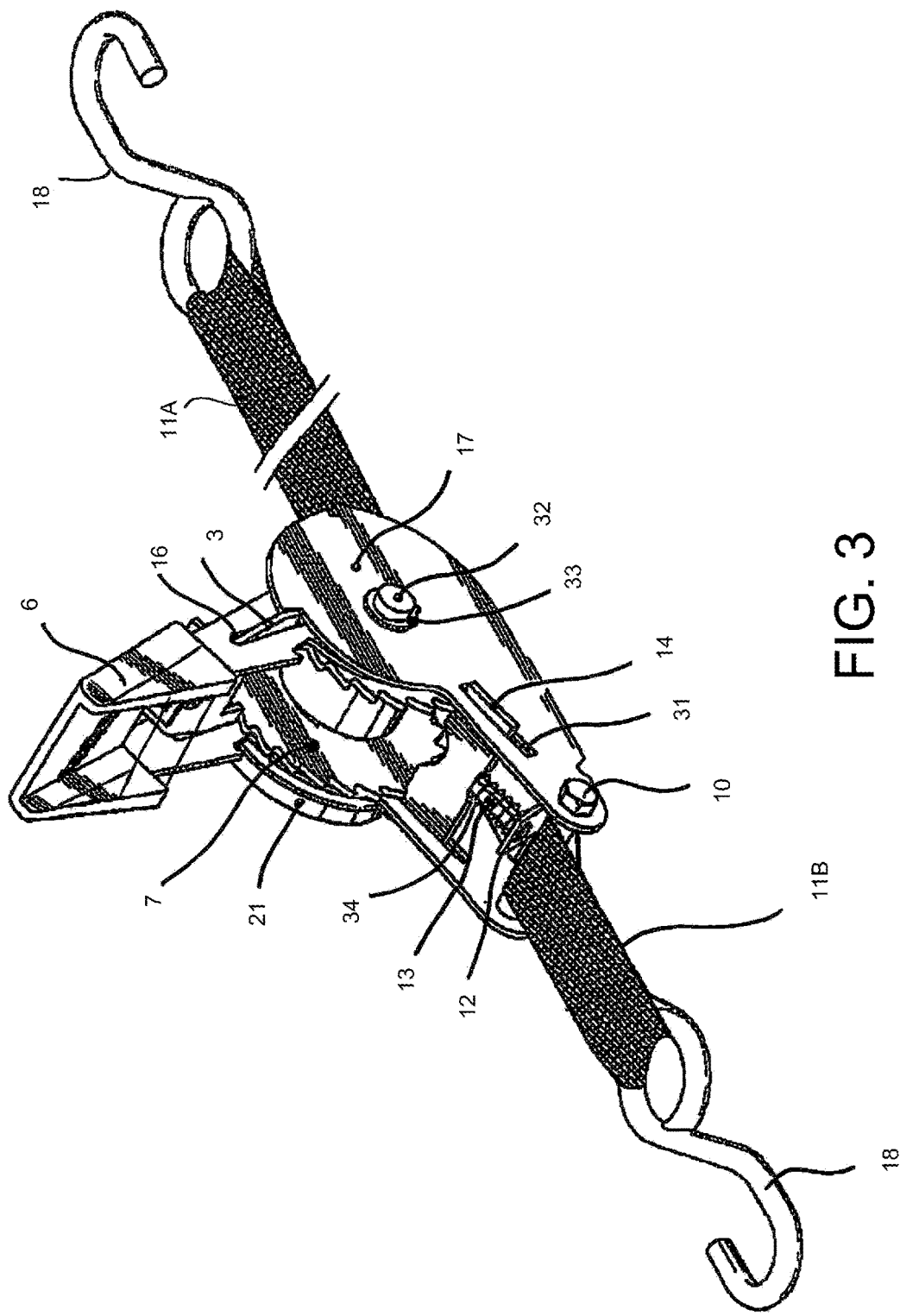
FIG. 3 shows a perspective view of the present invention including dual straps.

Referring to FIGS. 1-3, prior art ratchet device 1 includes handle lever 2 and lateral frame 9. Handle 2 includes handle detent pawl plate 3 coupled to detent spring 4 and held back by stop 5. Spring urges detent pawl plate 3 to engage with ratchet teeth 17. Handle includes ergonomic grip 6 to allow manual activation of rotation around axle 32. Handle detent pawl plate 3 runs along handle pawl plate slot 16 in handle 2. Detent engages ratchet spool 7 held within frame guide 8. Strap is included and wound around axle 32. A second stop is included. Detent pawl plate 14 is urged by frame detent pawl plate spring 13 against frame spring stop 12 to urge detent pawl plate 14 into engagement with teeth of ratchet spool. A second strap 11B is attached to rod 10 wherein rod 10 follows through apertures 19 and 20 in frame 9.

Coil spring 22 wraps around center coil spring 23 along axle 32. Coil spring is attached via outer coil spring anchor 24 to frame in order to urge spring. Coil spring 22 and center coil spring 23 are included on the exterior of frame within external coil spring housing 21 along frame wall 26. Straps 11A and 11B may terminate in hooks 18. Strap 11A may be attached to coil spring via sharp edge at the slot of hub 15 in order to secure strap.

The embodiment shown in FIG. 3 lateral frame detent pawl slot 31 houses detent pawl plate 14 which is urged by pawl plate spring 13 against stop 12 to engage with teeth of spool. Optionally, pawl plate guide pin 34 is included to facilitate pawl engagement and disengagement. Rod 10 extends through apertures in frame walls 26 and 27 to provide an anchor for strap 11B. Axle 32 runs through apertures in frame wall and extends through strap coil and coil spring. Axle bearing 33 guides axle 32 so that axle bearing 33 does not rotate in the direction of strap rotation, while axle and spool rotates freely to engage the strap.

One major disadvantage of ratchets of the prior art is the location of the coil spring and the weakness of design wherein the spring is mounted on the outside of frame walls in an external coil spring housing that is not protected by the frame or any other piece aside from the housing which can be detached from the frame easily.

Figure 4:
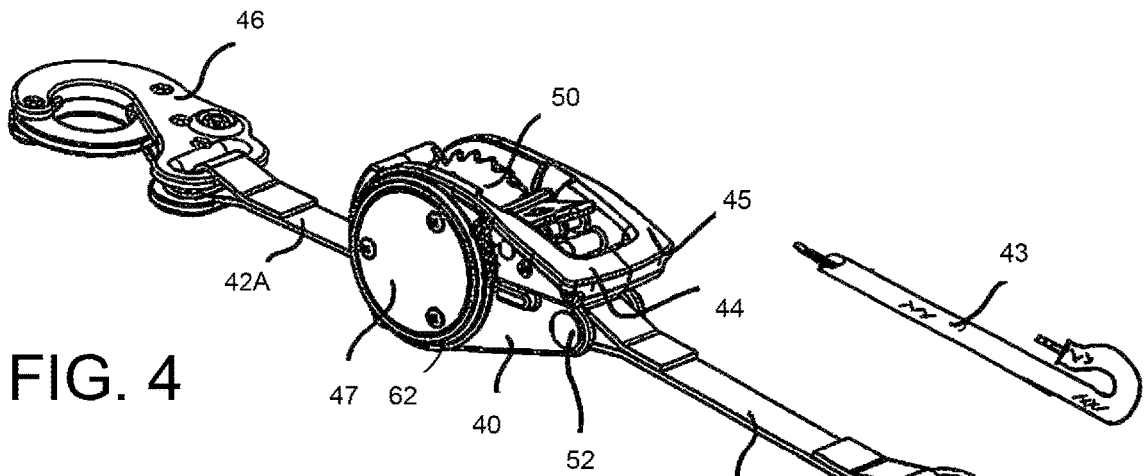
FIG. 4 illustrates an alternative embodiment of the present invention with specialized hooks.
Figure 5:
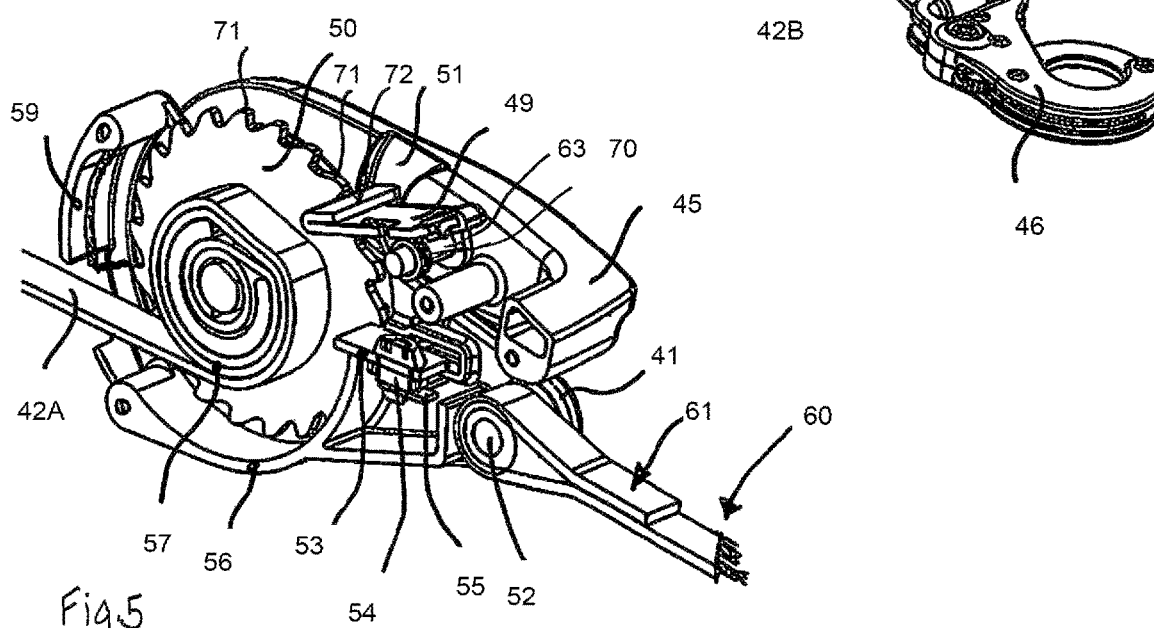
FIG. 5 shows a close-up cutaway perspective view of an embodiment of the present invention.
Figure 6:
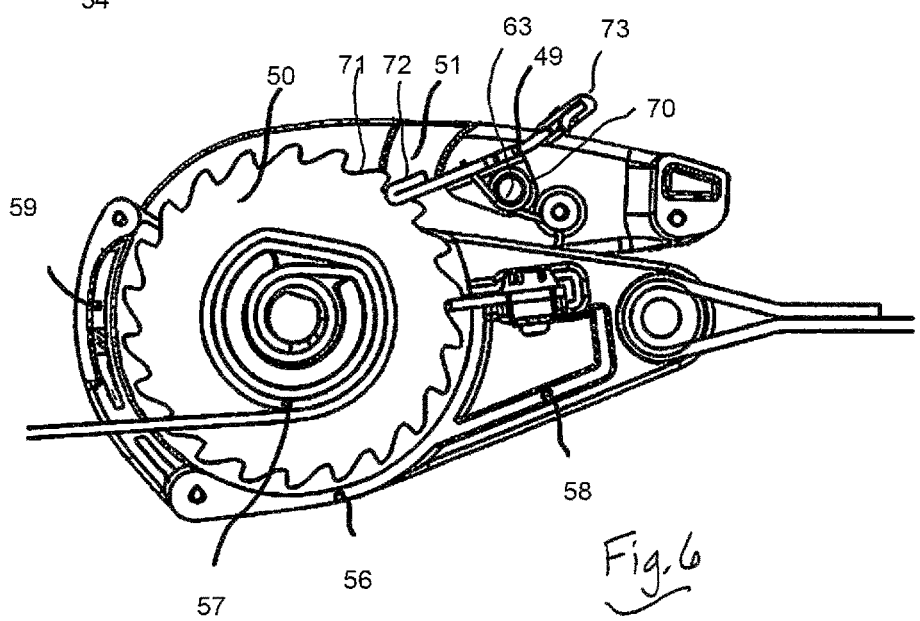
FIG. 6 illustrates a partially cutaway side view of the embodiment shown in FIG. 5.

Referring to FIGS. 4, 5 and 6, an exemplary embodiment of the present invention is demonstrated. Left body frame 40 mates with right body frame 41. Straps 42A and 42B are attached to ratchet. Strap 42A is attached to ratchet via coiling around spool 57. Strap 42B is attached to frames 40 and 41 via belt pin 52 which extends through apertures in frame walls 40 and 41 in order to anchor strap 42B. Handle includes left handle body 44 and complementary right handle body 45 for housing the handle to operate the ratchet. Hooks 46 may be included on ends of straps 42A and 42B. Left coil spring cover 47 embodies a flat disc which can be mounted within extended rim 62 along frame 40 so as to keep coil spring cover 47 flush or recessed from rim 62. Handle pawl 49 rotates along pin 63 and is urged by spring 70 into engagement with teeth 71 of spool hub ratchet 50. Pawl 49 includes bent over end 72, bent over end 72 engages with teeth 71 of spool hub ratchet 50. By bending over the handle pawl end, this leads to a rounded feature which prevents wear on spool hub ratchet 50 and teeth 71. Bending over end of pawl also provides stronger contact with teeth at multiple angles and structural integrity to pawl 49. Pawl 49 rotates along pin 63 and is activated via pawl finger handle 73 to allow rotation around pin 63 to disengage pawl from ratchet teeth 71. Referring now to the body and frames, body includes body detent pawl plate 53 for further engagement with teeth 71 of ratchet 50. Body detent pawl plate 53 can be locked into place via pawl lock 54 which is rotated by pawl lock cam 55. Strap 42A enters into body past belt pawl lock channel 59 and into strap guide 56 to provide for a coiled strap around spool 57. Frame may also include lock guard 58 along frame near hook or belt pin to prevent release of body pawl with ratchet. As can be seen on the end of rope 42B in FIG. 5, strap 42B may be of any strap or webbing known in the art to provide for a strong hold with much linear strength. Belt or strap 60 may be wrapped around belt pin 52 and welded or otherwise secured at end 61 to belt 60 or strap 42B.

Figure 7:
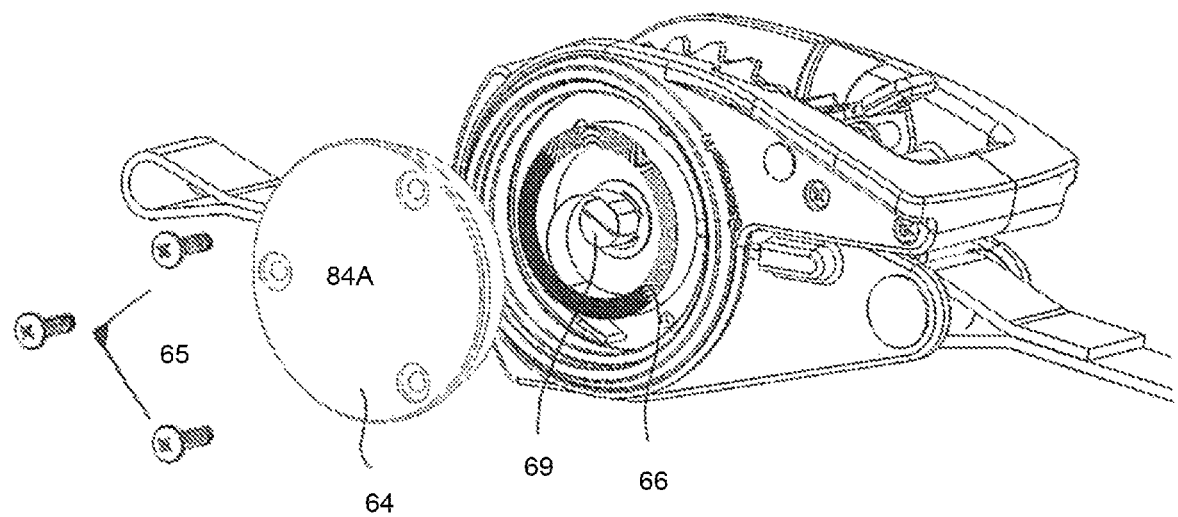
FIG. 7 demonstrates a partially exploded side perspective view of an embodiment of the present invention.
Figure 8:
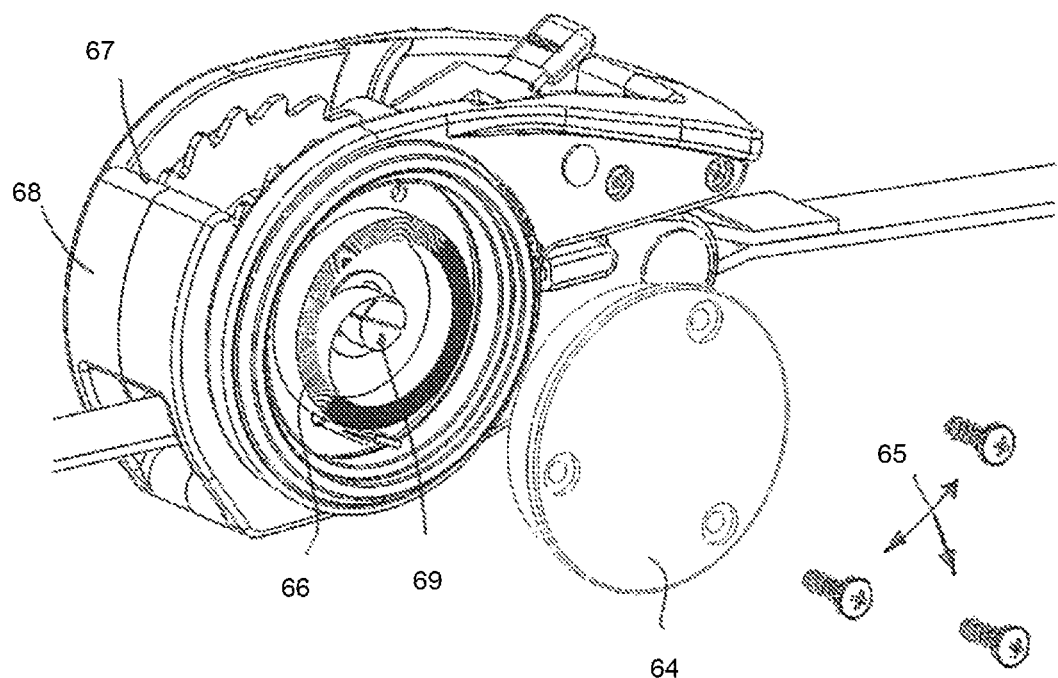

As shown on FIGS. 7 and 8, the coil is mounted inside the handle body side. Coil spring 66 wraps around axle 69 and is secured thereto on one end. By securing coil spring 66 to axle 69, axle is urged to spool to rotate against spring 66. Rim 62 or ridge as shown surrounds, and has a diameter greater than, coil spring 66. Ridge is part of body frame and is integrated therein. Coil spring cover is included to cover and guard coil spring 66. Coil spring cover includes at least one flat surface 84 that can be flush or recessed when cover 64 is mounted onto the ratchet. Coil spring cover 64 may be mounted or coupled with the ratchet of an embodiment of the present invention via screws 65. As can be shown from the alternate view in FIG. 7, ratchet includes body stop 67 to prevent overextension of ratchet. Rear body cover 68 further protects the ratchet and teeth of the present invention and provides for security along the region in which ratchet cannot be opened.

Figure 9A:
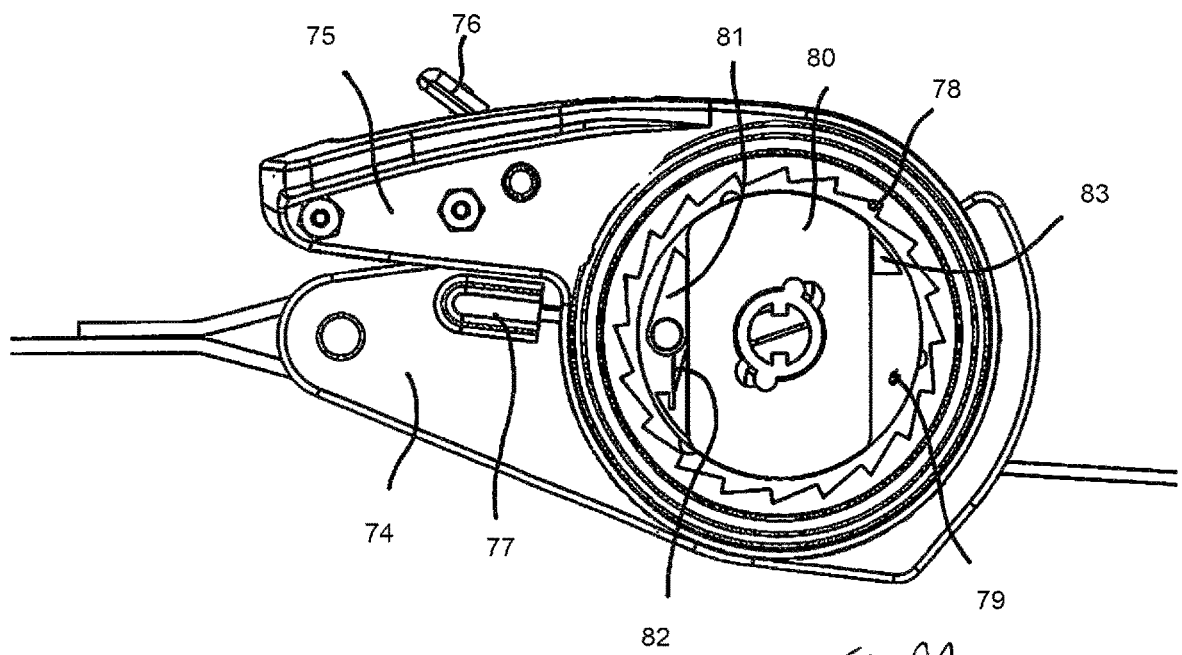
FIG. 9A demonstrates a partial cutaway view of an embodiment of the present invention in first mode.
Figure 9B:
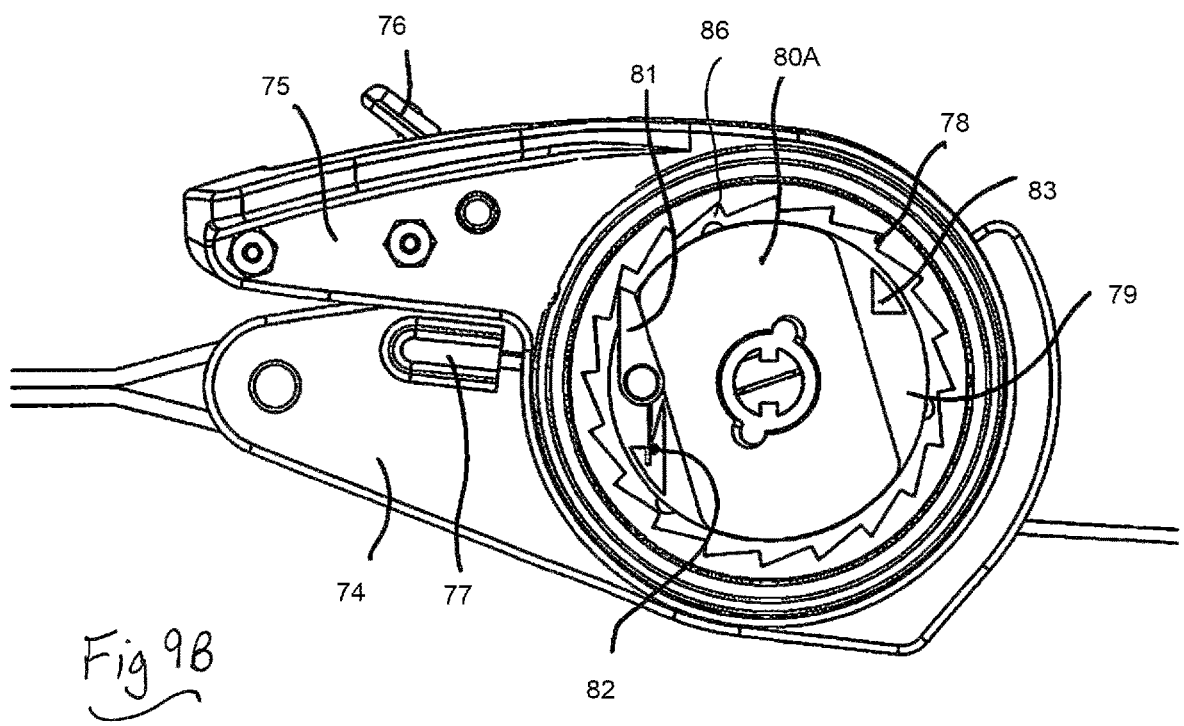
FIG. 9B illustrates a partial cutaway view of an embodiment of the present invention in second mode.

Referring to cutaway FIGS. 9A and 9B, the left side of the ratchet coil and spring is shown including optional centrifugal clutch. In this embodiment, left body frame 74 is shown and attaches with left handle 75 around the ratcheting spool. Handle pawl 76 rotates around pin 85 to provide for the pawl's engagement with teeth of the ratchet spool. Slidable body pawl (not shown) can be covered for security by cover detent 77. Gear 78 can be recessed coil spring as shown. Clutch plate 79 extends next to spring gear 78. Centrifugal plate engaging brake pawl 80 works with brake pawl spring and stop 82 and brake pawl 81 to engage with interior teeth 86 of gear 78. As shown in FIG. 7A, brake pawl 81 is disengaged and shown in FIG. 713, brake pawl is engaged with teeth 86.

Figure 10:
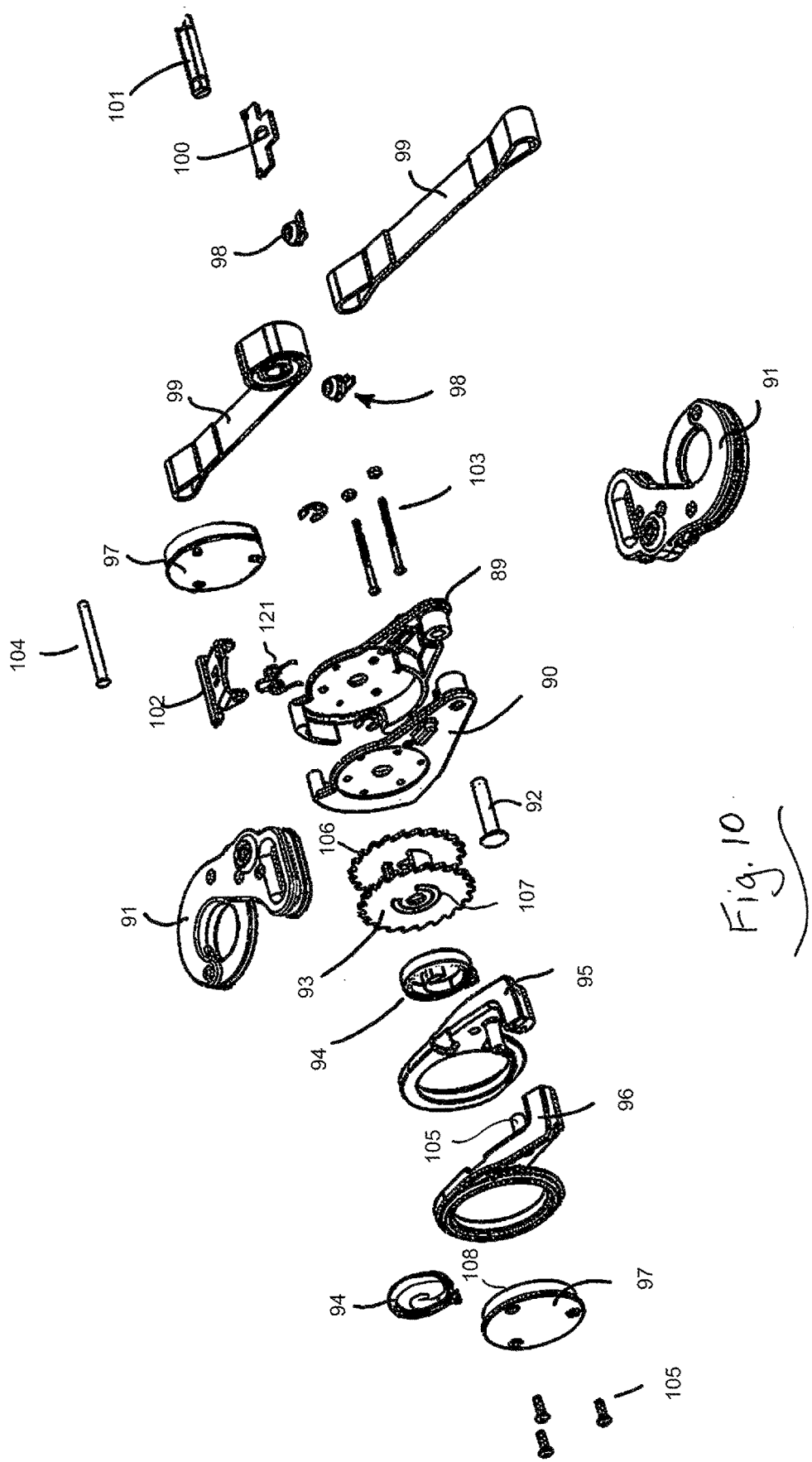
FIG. 10 demonstrates an exploded view of the present invention.

Referring now to the exploded version of FIG. 10, right body frame 89 mates with left body frame 90 with complementary features. Hooks 91 attached to straps 99 to provide for the mounting of the embodiment of the present invention against two separate items not shown. Spool hub 93 fits within body frames 89 and 90 and includes ratchet teeth 106. Spool body frame 93 further includes center connector 107 which may engage with coil springs 94. Handle is shown in two parts and right handle body 95 and left handle body 96. Coil spring cover 97 includes extending circular ridge 108 to mate with recessed cavity in left handle body %. Covers 97 are attached via screws 105. Ratchet of this embodiment may include body pawl lock 98. Body detent pawl plate 100 may also be used to engage ratchet when ratchet is in use. Handle pawl 102 is activated by spring 121 to urge handle pawl to engage with spool hub 93 when ratcheting is necessary. When ratcheting is not necessary, handle pawl 102 can rotate via pressure with a thumb to disengage handle pawl from ratchet teeth. Handle rivet 104 is included at the holding end of handle through bosses 105 to provide additional support given the dual piece nature of handle.

Referring to FIGS. 11A and 11B, sheet metal body frame A includes no over molding. Body frame B includes over molding for demonstration of the body frame of an embodiment of the present invention. Body stop 109 is shown along frame to prevent ratchet from extending too far. Handle pawl lock 111 is shown along frame latch 110 as is known in the art for ratchet use. Handle pawl frame latch 110 and pawl lock 111 are included to provide for handle pawl trigger to rest in a locked or neutral position. Body frame A includes body slot 112 for pawl plate 114. Frame includes flared axle boss 113 to allow for axle to extend past a plane within the frame. Body detent pawl plate 114 includes molded torsion spring cavity pawl spring 115. Raised pin boss 116 provides location for pin (not shown) through pin hole 117, pin being included to attach to a strap. Body lock guard 118 is provided to protect the body lock. Strap guide 119 and strap lock 120 allow for access of a strap between body cam and into spool. Lock 120 is provided to lock strap in place in ratchet of the present invention.

Figure 12B:
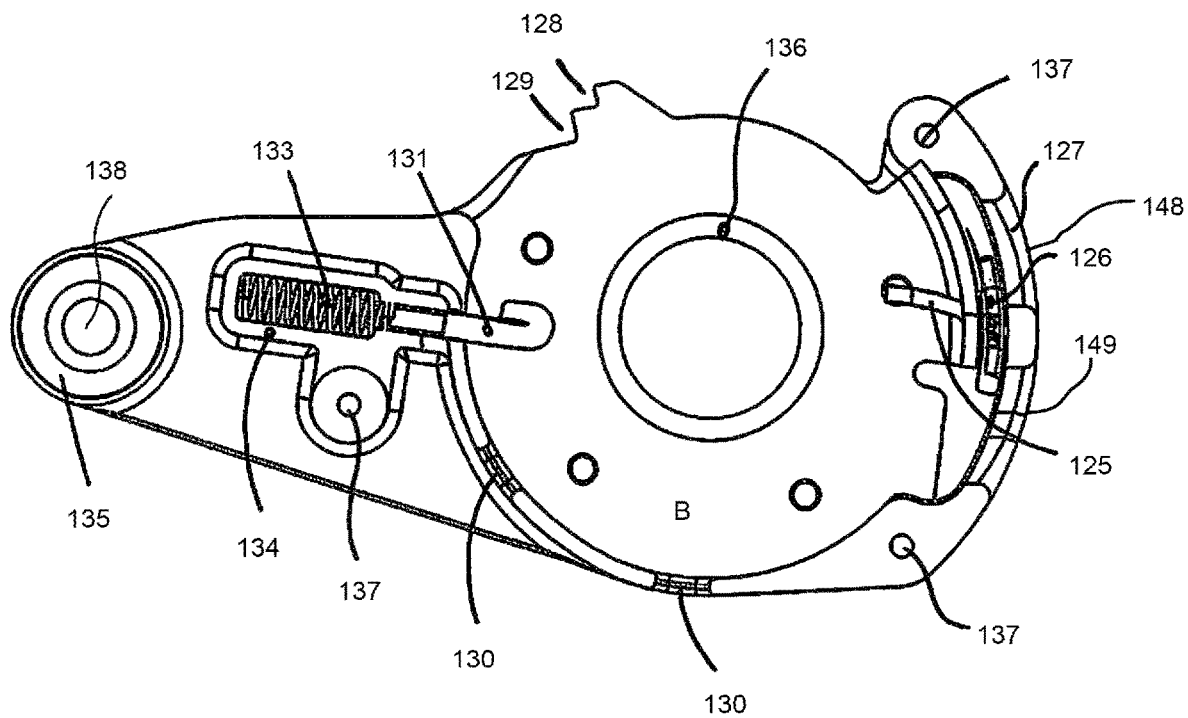
FIG. 12B illustrates the opposite side of the side view as shown in FIG. 11A.
Figure 12A:
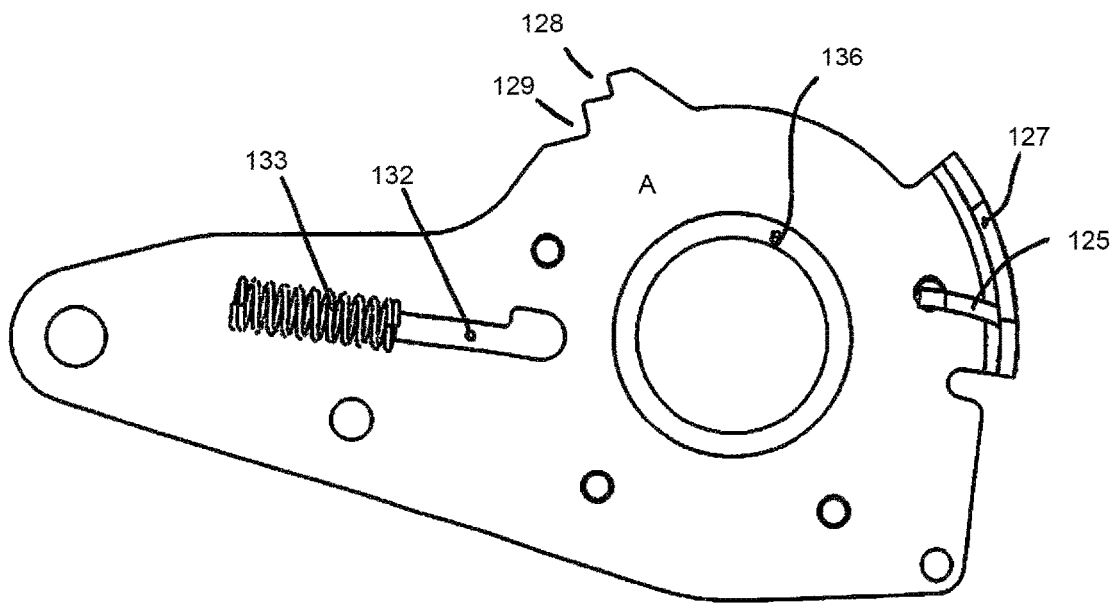
FIG. 12A demonstrates a side view of a body of the present invention to complement FIGS. 9A and 91.
Figure 12C:
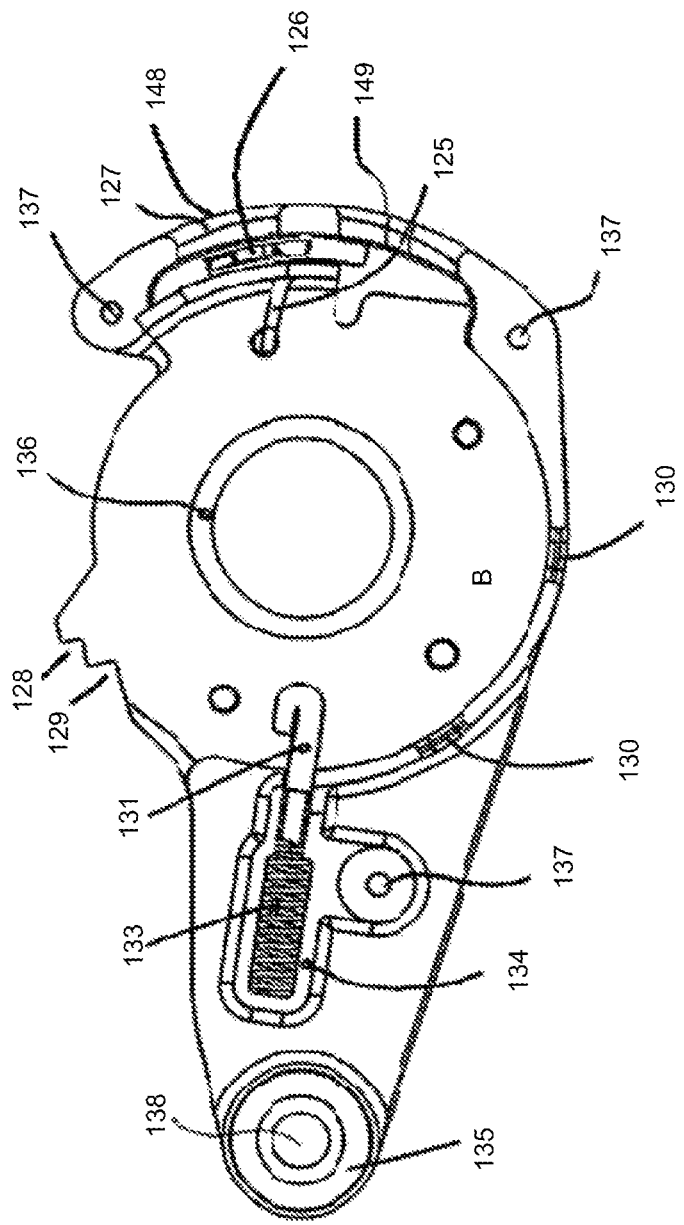
FIG. 12C illustrates the opposite side of the side view as shown in FIG. 11A with body lock engaged.

Referring to FIGS. 12A and 12B, side view of the body with and without over molding. Rope stripper 125 is included for engagement with rope in an embodiment of the present invention. Rope may be locked via strap lock pawl 126 along with flared bent body end 127. Referring to the handle pawl, handle second stop 129 is provided along with handle first stop 128 to engage handle pawl and lock it into place for use of the ratchet. Body guide cavity 130 is provided within body. Body detent pawl 131 forces engagement with ratchet spool (not shown). Body detent pawl is urged via pawl spring 133 to push into spool along body pawl slot 132. Body pawl is included in body pawl spring holder 134. As in other embodiments, a raised boss is included around pin as shown here raised boss 135 around aperture 138. Body screw boss holes 137 is also included.

Figure 13A:
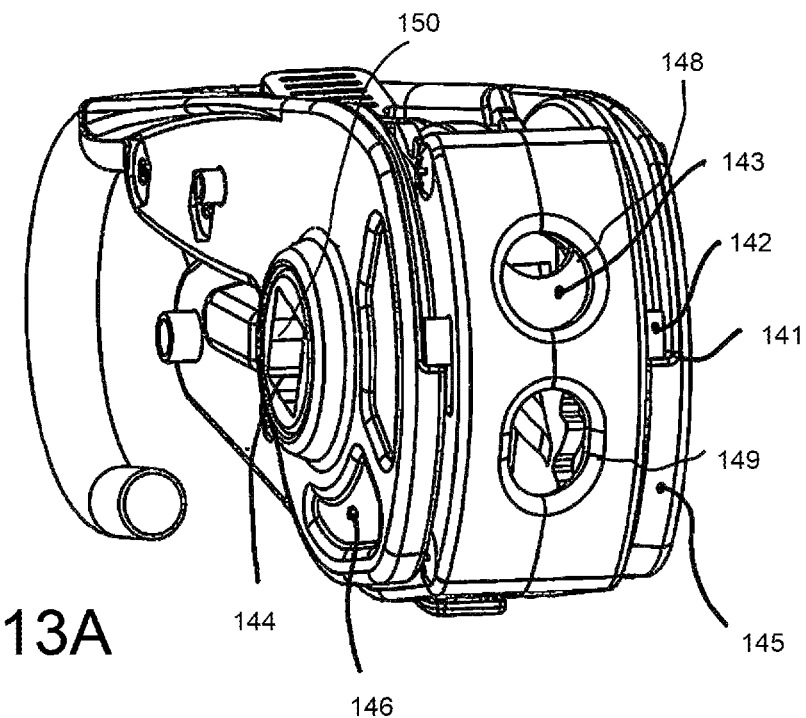
FIG. 13A demonstrates an embodiment of the present invention with an engaged lock.
Figure 13B:
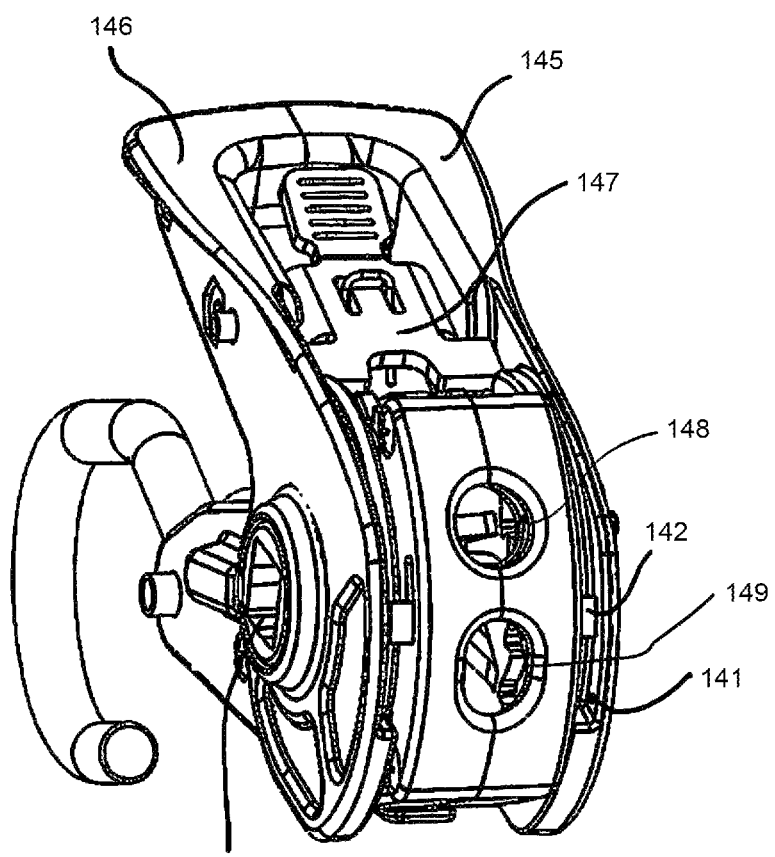
FIG. 13B shows the embodiment as shown in FIG. 11A wherein the lock is disengaged.
Figure 13C:
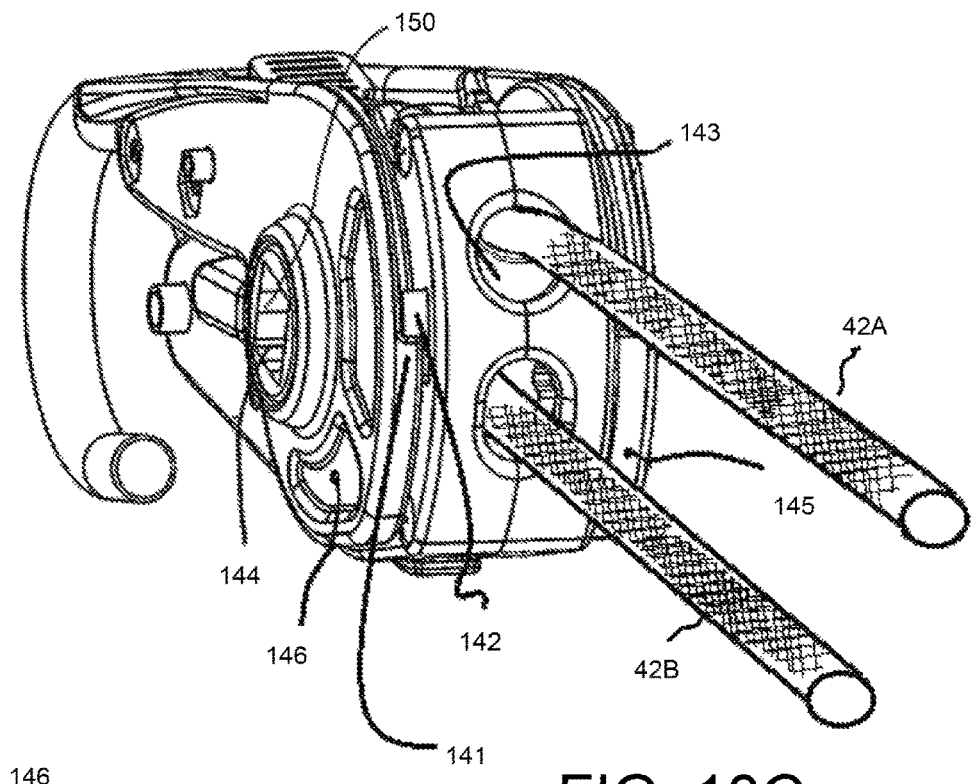
FIG. 13C demonstrates an embodiment of the present invention with an engaged lock as shown in FIG. 13A.
Figure 13D:
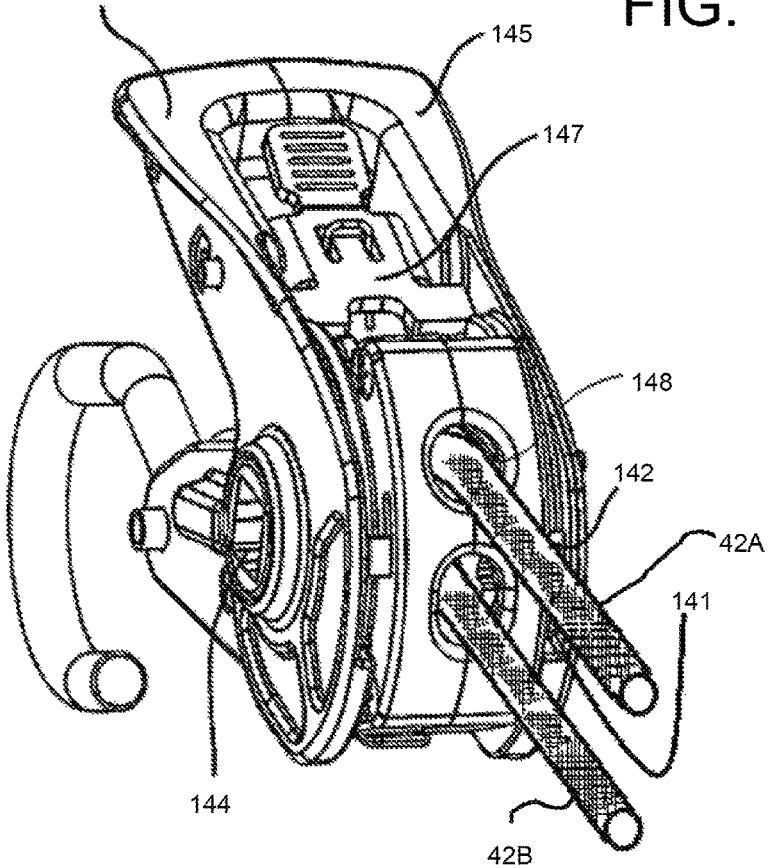
FIG. 13D shows the embodiment as shown in FIG. 11A wherein the lock is disengaged as shown in FIG. 13B.

Referring now to the locking mechanism of an embodiment of the present invention, lock works with a preferred rope or cylindrical type strap and/or webbing of the present invention. As shown in FIG. 13A, handle is down and in a locked position and in FIG. 13B handle is in an up unlocked position. Handle lock cam 141 is provided near body lock pawl plate tab 142 of body lock 143. Handle lock cam 141 is urged upwards from its position in FIG. 138 to its position in FIG. 13A via tab 142 to close body lock 143 in aperture 148. In such an embodiment of the present invention rope ends extend from apertures 148 and 149 into and out of ratchet. Axle 144 includes extended bosses to receive external tools to apply rotation to the spool within box recess 150 of handle as known in the art can be used within extended bosses 144. Right handle 145 and left handle 146 mate together. Handle pawl 147 is shown to rotate to urge handle pawl to engage and disengage with a ratchet spool not shown. FIG. 13C shows the embodiment of FIG. 13A with cord 42 having cord portions 42A locked into position in aperture 148, with cord portion 428 set below out second aperture 149. FIG. 13D shows the embodiment of FIG. 13B with cord portions 42A and 42B set freely through apertures 148 and 149, respectively.

Figure 14A:
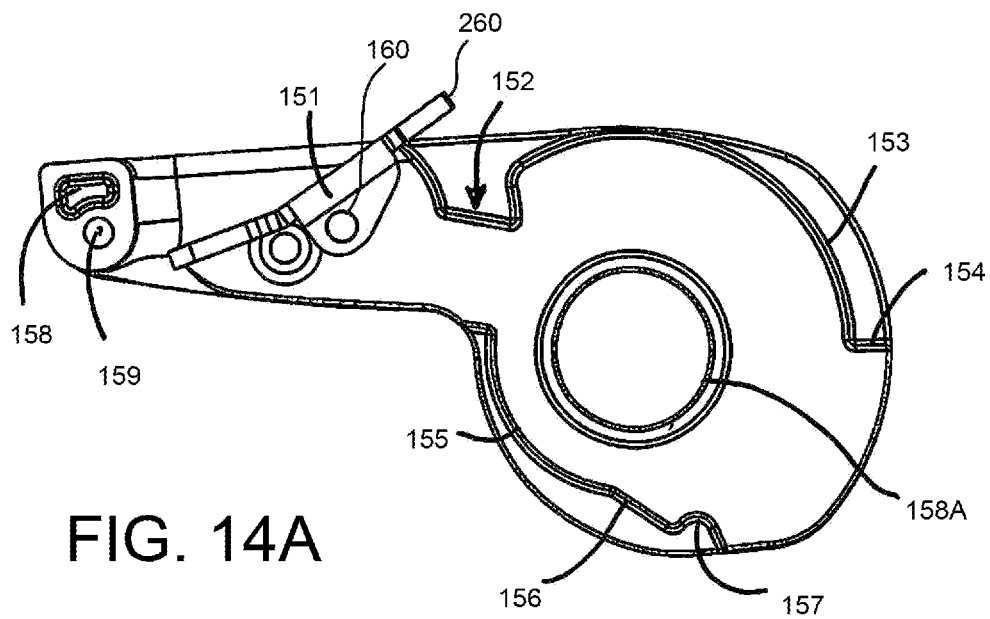
FIG. 14A demonstrates a side partial view of the handle of the present invention.
Figure 14B:
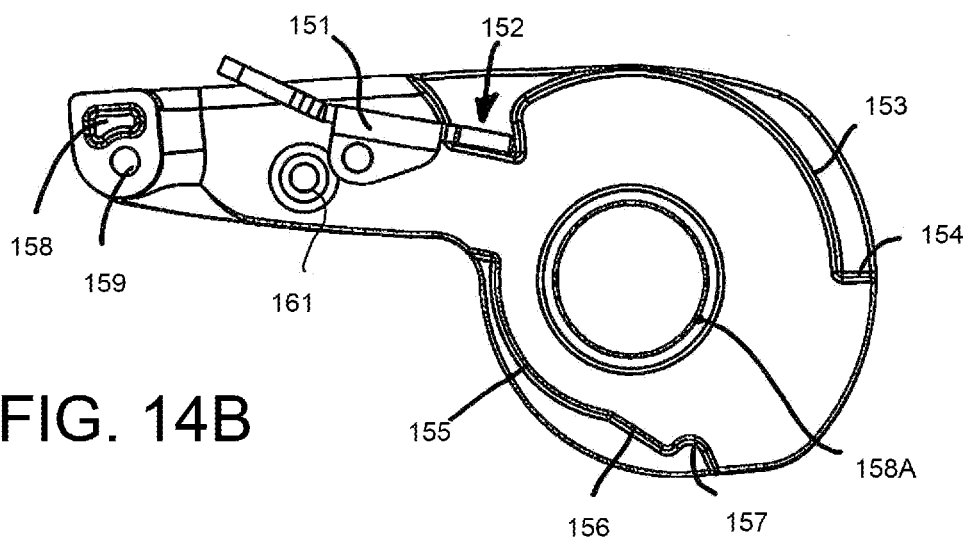
FIG. 14B demonstrates the half view of the handle of FIG. 12A with the lock in second mode.
Figure 14C:
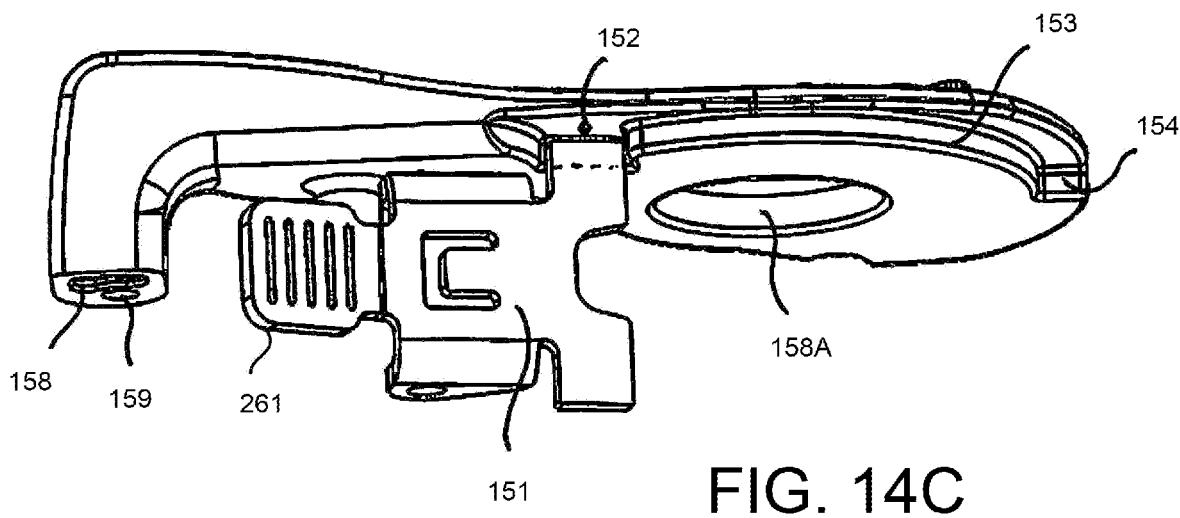
FIG. 14C demonstrates a top view of the half of the handle as also shown in FIGS. 12A and 12B.

Referring now to FIGS. 14A-C handle is shown. FIG. 14A handle is shown with the pawl depressed. In FIG. 14B, handle is shown with pawl is recessed support guide. And, finally, in FIG. 14C, the angled view is shown to illustrate the recessed pawl guide supporting the pawl while handle is rotated and engaged with the spool ratchet gear. Handle pawl 151 rotates around pin 160 and engages in handle recess cavity support for pawl 142 in a first clockwise direction and is stopped via stop 161 in counterclockwise direction. Handle pawl is disengaged from spool via depressing in the counterclockwise direction such as with a finger or thumb on the handle pawl to rotate and out of engagement with ratchet. As can be seen in handle, top handle cam 153 extends along to top cam stop to control ratcheting of the device. First arched edge cam 155 meets second arched edge cam 156 and extends further to recessed cam stop 157. This view of the handle includes female cavity 158 to receive a male portion (not shown). Handle aperture 158 provides for mounting onto frame (not shown). Handle grip hole 159 further allows handle to be supported by boss or rivet. Female cavity to receive male portion 158 and handle grip screw hole 159 both allow for mating of this one side of handle with a complementary handle side for the other side.

Figure 15:
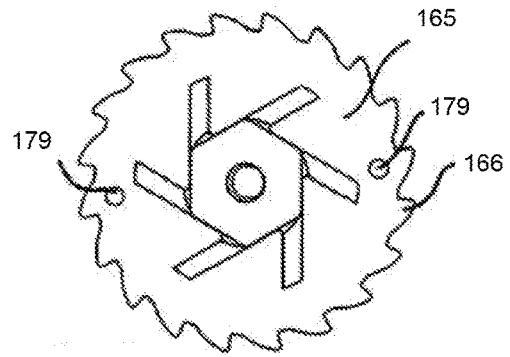
FIG. 15 illustrates a ratchet wheel of the embodiment of the present invention.
Figure 16:
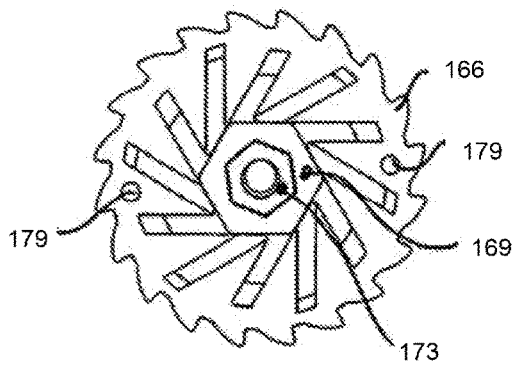
FIG. 16 illustrates a ratchet wheel of the embodiment of the present invention.
Figure 17:
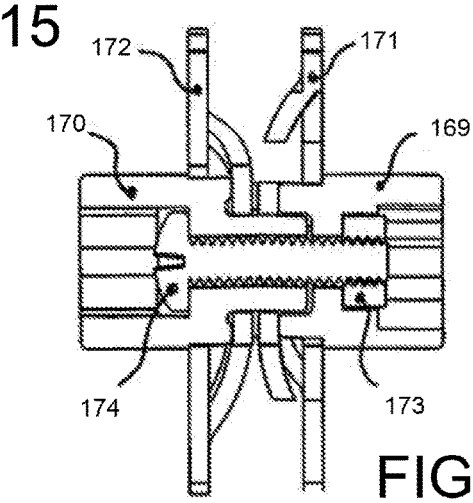
FIG. 17 demonstrates a frontal cross-sectional view of a rope spool of an embodiment of the present invention.

Referring now to FIG. 15, a rope spool and hub rope guide of an embodiment of the present invention is shown. Half spool disc with ratchet gears of the preferred embodiment is further illustrated in FIG. 15. Stamped tangential ribs opposing the face wheel 165 are included. Stamped disc gear ratchet 166 includes an additional embodiment of the gear ratchet. Assembly guide 179 may be included to facilitate assembly of the ratchet gear. It is preferred that there are six tangential ribs extending from a hex nut in the present invention, as can be more clearly shown in FIG. 17. FIG. 16 shows an alternative embodiment of the hex nut with more than six tangential ribs. As shown in FIG. 17, the assembled spool hub with the cross-sectional view. Right wheel boss 170 includes recessed shaped cavity to receive external tools to apply rotation to spool wheel. For instance, through access on wheel screw 174. Tangential wheel discs right 171 and left 172 provide for better grip of a rope in the present embodiment. Right wheel boss 169 includes recessed shaped cavity to receive external tools to apply rotation to spool wheel.

Figure 19:
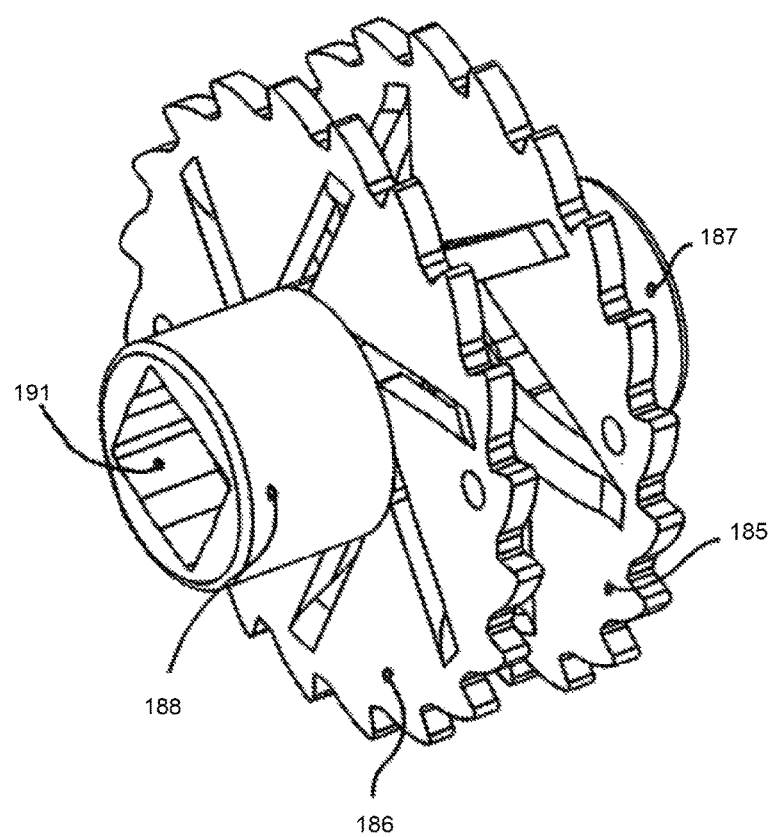
FIG. 19 demonstrates a rope spool wheel of an embodiment of the present invention.
Figure 20:
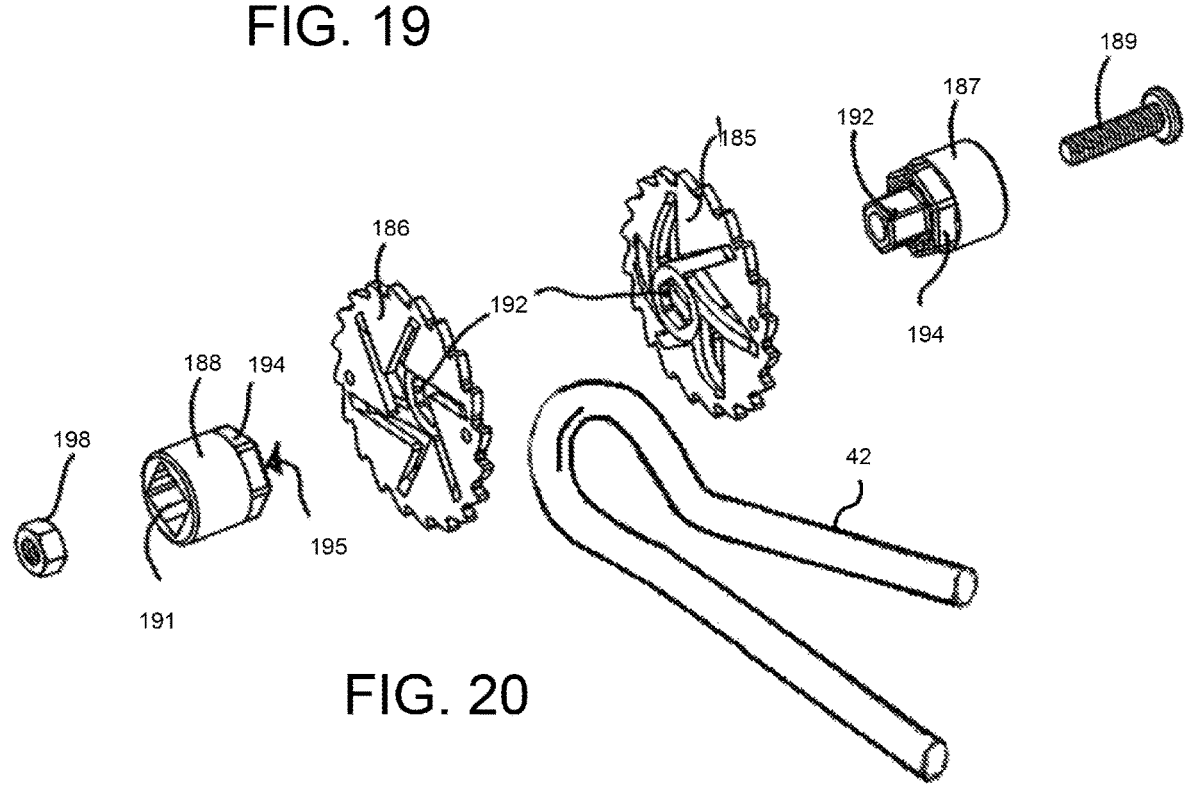
FIG. 20 demonstrates an exploded view of a rope spool wheel of an embodiment of the present invention.

Referring to FIG. 20, handle 176 includes handle pawl 175 which may rotatably engage with the ratchet wheel. In this embodiment, a ¾ inch diameter rope or cord 42 may follow through rope guide 178, along body frame 177. The rope spool wheel of this embodiment of the present invention for a rope ratchet assembly is further demonstrated in embodiments of FIG. 19 and exploded in FIG. 20. Right stamped tangential wheel disc 185 mates with left stamped tangential wheel disc 186. Male and female wheel boss hubs with hexed ends 187 and 188, respectively, are outside of tangential wheel discs. Cavity 191 is shaped to receive an external tool, and may be of any shape as is known in the art to provide for rotation of a spool through external tool, example such as a wrench.

Referring to FIG. 20, right and left stamped tangential wheel discs 185 and 186 mate and expose hexed cavity 192 to receive boss hubs. Right male wheel boss hub 187 passes through rope spool wheel to mate with left female wheel boss hub. Female hex keyway 195 fits within large hexed ends 194 of the bosses. Nut 190 may be included to secure screw fitting through both bosses and the rope spool wheel.

Figure 21:
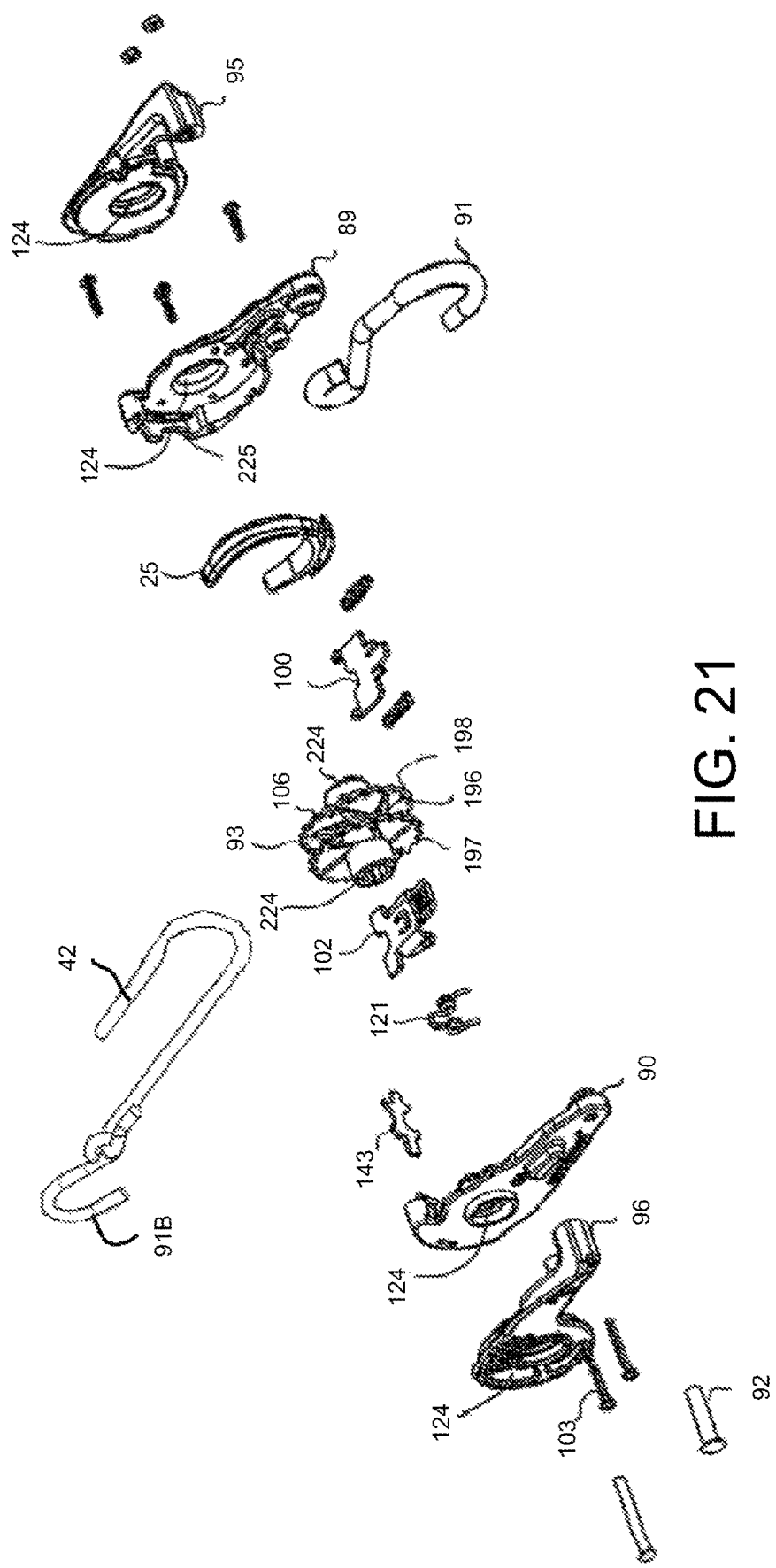
FIG. 21 demonstrates an exploded view of an embodiment of the present invention.
Figure 22:
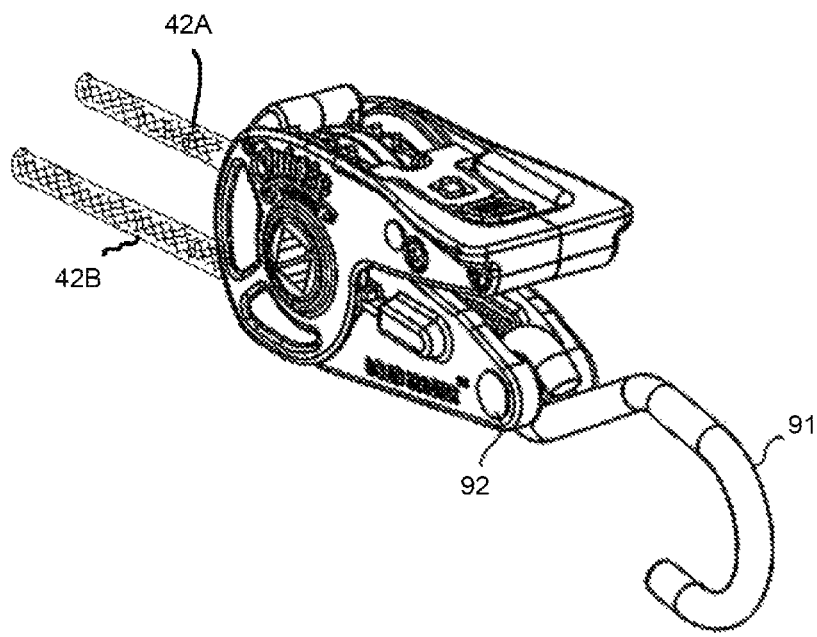
FIG. 22 demonstrates a perspective view of an embodiment of the present invention.
Figure 23A:
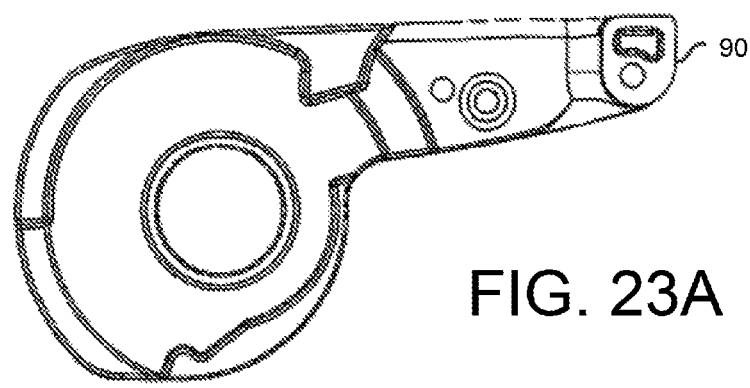
FIGS. 23A and 23B demonstrate a side view of a side of the present invention in first and second directions.
Figure 23B:
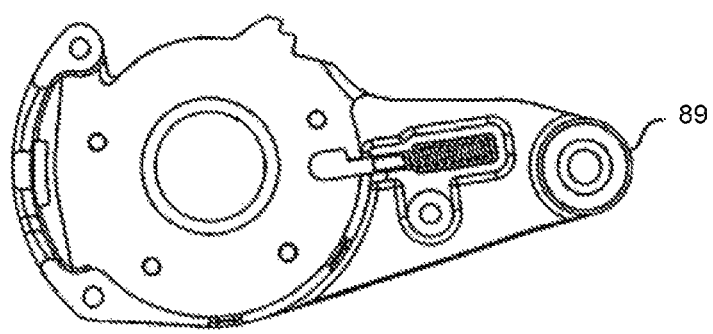

Referring to FIGS. 21-23, an exploded version of an alternative embodiment of the present ratchet invention is provided. Hook 91 attaches directly to pin 92 along frame, through frame body sides 89 and 90. Handle sides 95 and 96 mate with frame along aperture 124 in handle and frames to mate with boss 224 off of spool hub 93. Spool hub 93, includes bosses 224 to allow access to spool hub 93 rotation when ratchet is assembled. Spool hub includes teeth 106 to interact with pawls along handle pawl 102 and body detent pawl plate 100. Handle pawl 102 rotatably engages with spool hub and is suspended by a pin and biased towards spool hub via spring 121. Lock 143 is provided to capture a portion of cord (not shown) when extending from back of frame through guide 225. Cord 42, with optionally attached hook 91B, wraps around spool hub 93 between spool plates 197 and 198. Indented arms 196 (preferably six) engage cord to secure rope or cord along spool. Cord portions 42A and 42B extend from ratchet.

Figure 24A:
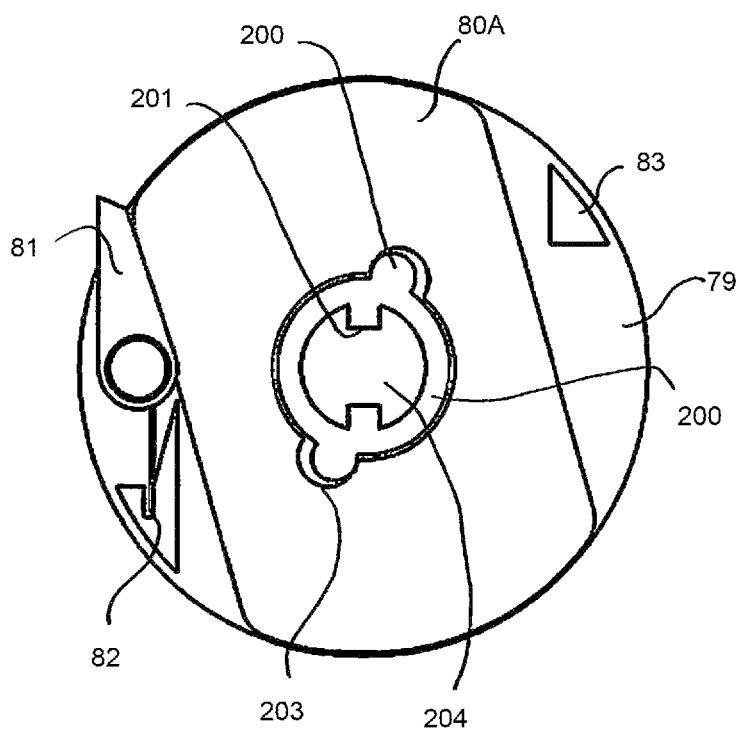
FIGS. 24A and 24B demonstrate a locking mechanism isolated view of an embodiment of the present invention.
Figure 24B:
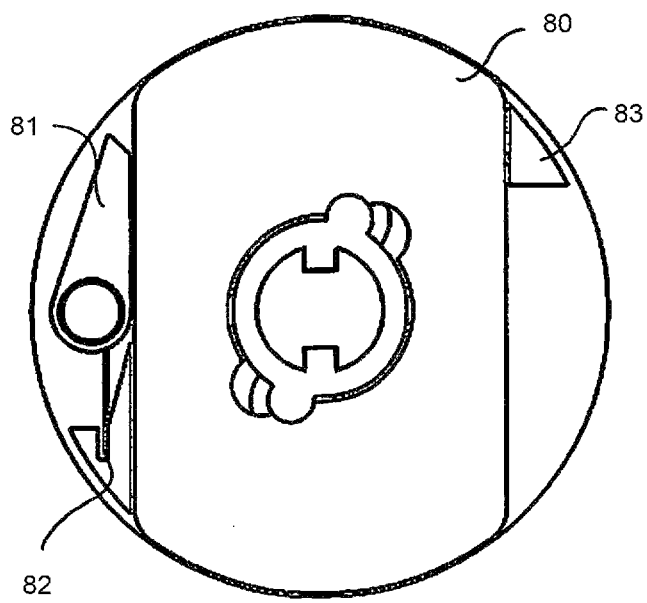

Referring to FIGS. 24A and 24B, centrifugal plate 80 is shown. Plate 80 includes aperture 204 with extended hubs 203 for accepted nubs 200 in stationary key 200. Key includes inlets 201 for engaging with a key or other item (not shown) and may be linked to the spool hub of the ratchet. Plate rotated from position 80 to position 80A and forces brake pawl 81 to extend outwardly from plate. Brake pawl 81 is biased via spring/stop 82. Brake pawl 81 slides along with the rotation of plate 80. Plate 80A rotates counterclockwise to meet with stop 82, and clockwise to meet with clutch stop 83. As such clutch allows for engagement with the auto-retraction spring of the present ratchet when pawl 81 is extended to engage spring and cause auto-retraction or pawl is not extended (shown in FIG. 24B) spring is not engaged for auto-retraction.

Another embodiment of the ratchet with clutch is to act as a brake when the auto-retraction of the cord/strap is happening too quickly. If spool auto-retracts too quickly, plate 80 is drawn into position 80A to force pawl 81 to extend out and brake the rotation of the spool against recessed coil spring gear. Clutch acts similar to a seat belt apparatus to prevent extension of the belt upon immediate draw (i.e. in a short stop or collision) and prevent cord movement via brake. When the auto-retraction spring is engaged on spool in the present ratchet invention, a strong spring force could cause a retraction at speeds unwanted and potentially cause danger with a connected hook flying towards ratchet and user. Centrifugal clutch along the side of auto-retracting ratchet solves this issue. Key can be used to hold open clutch brake to manually override clutch.

One aspect of the present invention is the internal spring housing, particularly shown in an embodiment of FIGS. 4-10. Handles 95 and 96 mate to actuate spool, which is in turn housed in frame. Spring forms around aperture in frame. Frame includes groove to allow for spring location at a point flush with frame exterior. A rim may also be provided to further protect spring from contact or exterior issues. This is an improvement of those auto-retracting ratchets of the prior art in that the spring is located to allow for optimal auto-retraction, but also housed within frame recess to prevent accidental destruction or wear on spring. Spring being under high pressure contains much stored energy and a rupture can cause major damage to ratchet frame housing and users.

Another aspect of the present invention includes the spring for auto-rotation being connected directly to the handle, and not the frame. Spring is biased by a stop in the handle. As handle is rotated to retract strap, handle is pulled back (ratcheted) while running along smooth part of teeth of ratchet (during pawl disengagement with spool) and loads spring with tension on each stroke.

Another aspect of the present invention includes the use of a frame that is formed of two separate pieces. As shown in FIG. 11, frame body includes right and left 89 and 90 that are held together by bolts 103. This is an improvement on the prior art stamped and folded frames that are commonly used in the art of ratchets. The use of dual frame bodies provides for significant increase in durability, at some additional cost.

Another aspect of the present invention is the locking mechanism. As shown in FIGS. 5 and 11, internal lock 98 provides for access of a key on the exterior of the ratchet to rotate lock into engagement with stop on ratchet to prevent rotation of spool and movement of strap. Lock 98 locks with center plate 100 to prevent movement of strap 99. Strap can be of any mode used in the art for holding down items. It is contemplated that the strap can be rubber, nylon, or metal cable over-molded with rubber or plastic. Straps useful in the present invention are on the order of 1" wide and ⅛-¼" thick, but may be ropes/cords, larger or smaller sized webbing or straps, etc. A rope useful in the present invention might be eight feet long to allow for tie down. Spool may include a diameter of 1.25-3 inches. For the rope embodiment of spool as shown in FIG. 19 et al. Rope/cord can be welded into spool and wind around.

Figure 18:
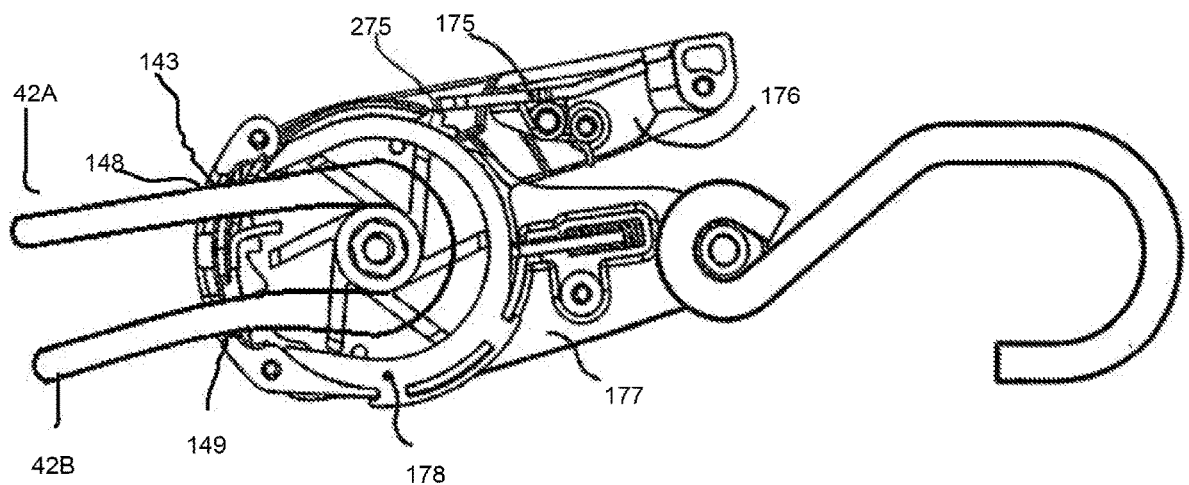
FIG. 18 demonstrates a partial cutaway side view of an embodiment of the present invention.

Another aspect of the present invention includes the rotatably engaged trigger assembly, as shown in FIG. 14, et al. Trigger 151 rotates around pin 160 so that end 260 engages into space 152, or a pocket in the frame wall, to lock the arrangement of handles and frames. Trigger is depressed with finger tab 261. Trigger may be biased to engage with an aspect of the frame or the spool, as shown in more detail in FIG. 18. Trigger 175 may engage with frame lock 275 to prevent ratchet from opening. Depressing trigger 175 allows the trigger to rotate out of lock. When ratchet handles are raised, trigger can be released and spring biases trigger plate to engage with teeth of spool for ratcheting.

Another aspect of the present invention can be seen in FIG. 14, et al. Top handle cam 153 is built into the main wall of handle, rather than added as a separate feature piece. This can also provide room for recess and rim to provide room for housing in the handle. The cam is hidden inside the handle to protect the wheel and narrow the device. This also prevent unwanted release if the cam is easily accessible as it is in prior art ratchets. The bent trigger, shown more in detail in FIG. 11A as end 114, provides advantages. The rounded aspect of the exterior of the end allows it to move more easily to engage teeth (not shown). Lock, as shown particularly in FIG. 13 et al. Provides for an additional level of security to lock the rope in place. Lock floats in body and provides a back up to trigger lock.

Figure 25:
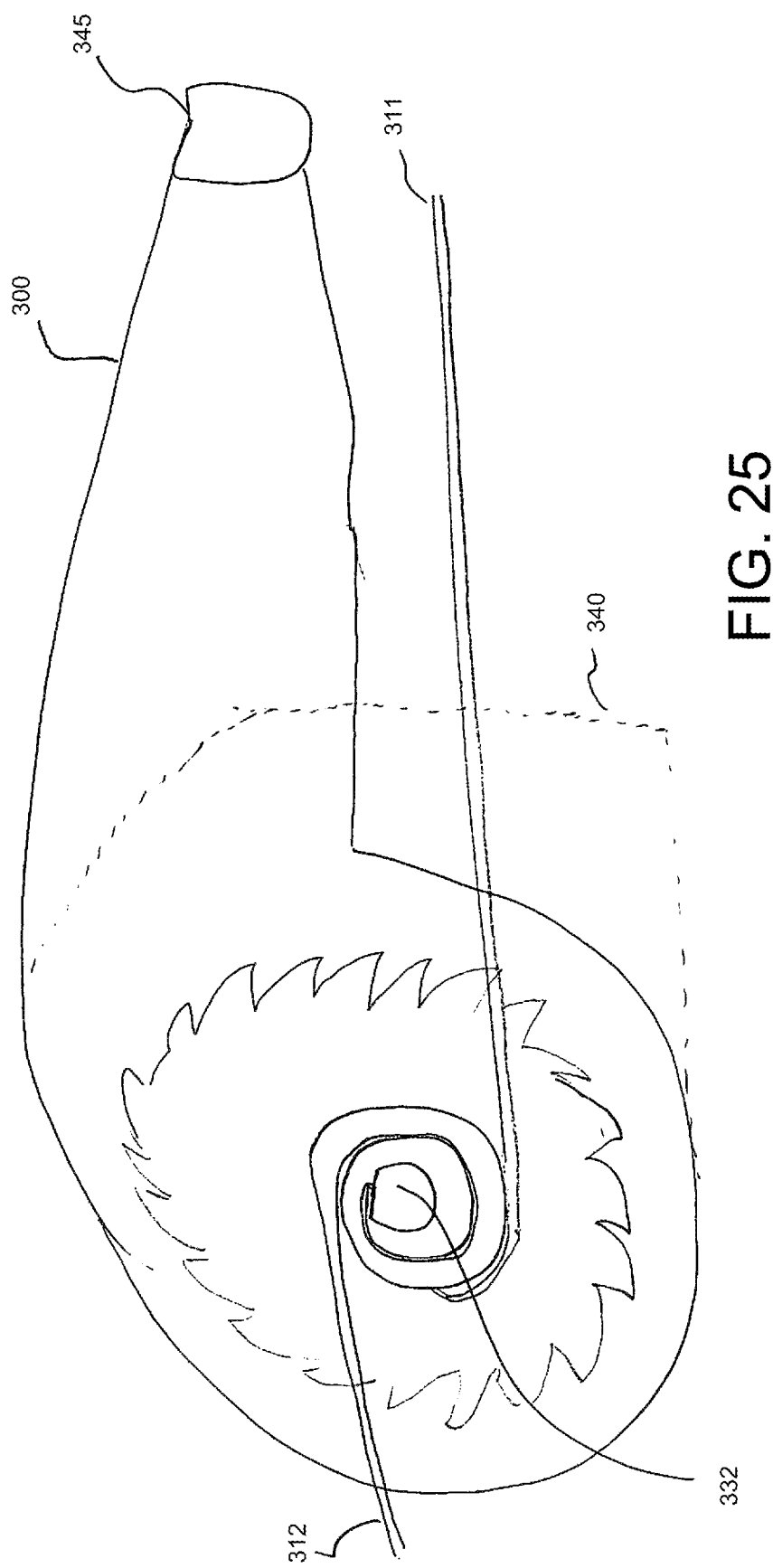
FIG. 25 demonstrates a dual ratchet pull mechanism of an embodiment of the present invention.

As shown in FIG. 25, handle 300, with right handle 345, is lengthened to provide for additional torque around axis 332. Straps 311 and 312 both wrap around axis to provide for dual tightening upon ratchet rotation. Frame 340 may remain the same size, or include reinforcement to allow for greater pressures as torque on spool and frame increases with the dual shortening embodiment. Frame preferably is open and includes walls separated enough to allow spool to wind and expand in radius beyond the height of the frame walls. Frame may also be closed.

As shown in FIGS. 26A-D, swivel hook 399 may be used directly on the frame to allow for a stationary strap to be mounted to frame, such as that shown in the prior art FIG. 1 along rod 10. Swivel hook 399 includes hook 319 attached to swivel pin 320. Swivel pin 320 is mounted within housing 321. Hook 319 may be coupled with pin 320 via bolt 350. Hook is free to rotate along the axis of bolt 350 and pin swivels within housing. This allows the hook to rotate freely in two dimensions to accommodate the rotation of the strap or rope affixed thereon. Housing 321 can also be mounted via apertures 351 to complimentary rod in frame to allow an additional dimension of rotation along rod axis.

I claim:

1. A rope ratchet apparatus comprising: (a) a frame; (b) a spool rotatably mounted within said frame, said spool comprising teeth along a periphery and adapted for ratcheting; (c) a first slot along a frame back end, said first slot adapted to allow passage of a first end of a cord from said spool; and (d) a second slot along said frame back end; wherein said cord set through said first slot, at least partially around said spool, and through said second slot; a movable lock within said frame, said movable lock adapted to move within said first slot and thereby restrict movement of said cord.

2. The rope ratchet of claim 1 further comprising a swivel hook on a front end of said frame, said front end opposite said back end.

3. The rope ratchet of claim 2 wherein said swivel hook is free to rotate relative to said frame along at least two dimensions.

4. The rope ratchet of claim 3 wherein said swivel hook is free to rotate relative to said frame along at least three dimensions.

5. A rope ratchet apparatus comprising: (a) a frame; (b) a spool rotatably mounted within said frame, said spool comprising teeth along a periphery and adapted for ratcheting; (c) a first slot along a frame back end, said first slot adapted to allow passage of a first end of a cord from said spool; and (d) a second slot along said frame back end; wherein said cord set through said first slot, at least partially around said spool, and through said second slot; a body lock set along said first slot and optionally movable to occlude at least a portion of a pathway of said cord within said first slot to cause a locking of a relative position of said cord relative said rope ratchet.

6. The rope ratchet of claim 5 further comprising a body lock pawl plate set within said frame, said body lock pawl plate set coupled to said body lock set, said body lock pawl plate set adapted to move between a first and second position, wherein said first position provides for the body lock set to be outside said cord pathway, and a second position wherein said body lock set at least partially occludes said pathway.

7. The rope ratchet of claim 1 further comprising a body detent pawl adapted to optionally engage said spool.

8. The rope ratchet of claim 7 further comprising a pawl spring coupled to said body detent pawl, said pawl spring providing bias force to cause said body detent pawl towards said spool.

* * * * *